(12) United States Patent
Chen et al.

(10) Patent No.: US 7,904,334 B2
(45) Date of Patent: Mar. 8, 2011

(54) SYSTEM AND METHOD FOR REDUCING EXCESS CAPACITY FOR RESTAURANTS AND OTHER INDUSTRIES DURING OFF-PEAK OR OTHER TIMES

(75) Inventors: Dazhi Chen, San Jose, CA (US); Elayna Berean, San Francisco, CA (US)

(73) Assignee: Mount Hamilton Partners, LLC, Mountain View, CA (US)

( * ) Notice: Subject to any disclaimer, the term of this patent is extended or adjusted under 35 U.S.C. 154(b) by 1224 days.

(21) Appl. No.: 10/849,935

(22) Filed: May 21, 2004

(65) Prior Publication Data

US 2004/0215517 A1    Oct. 28, 2004

Related U.S. Application Data

(63) Continuation of application No. 09/580,546, filed on May 30, 2000, now Pat. No. 6,741,969, which is a continuation-in-part of application No. 09/461,336, filed on Dec. 15, 1999.

(51) Int. Cl.
*G06Q 30/00* (2006.01)
*G05B 19/418* (2006.01)

(52) U.S. Cl. .................... 705/14.4; 705/5; 705/15
(58) Field of Classification Search ............ 705/14, 705/5, 6, 15, 27
See application file for complete search history.

(56) References Cited

U.S. PATENT DOCUMENTS

| | | | |
|---|---|---|---|
| 5,761,648 A | 6/1998 | Golden et al. | 705/14 |
| 5,794,210 A | 8/1998 | Goldhaber et al. | 705/14 |
| 5,803,500 A | 9/1998 | Mossberg | 283/67 |
| 5,855,007 A | 12/1998 | Jovicic et al. | 705/14 |
| 5,897,620 A | 4/1999 | Walker et al. | 705/5 |
| 5,903,874 A | 5/1999 | Leonard et al. | 705/14 |
| 5,923,016 A | 7/1999 | Fredregill et al. | 235/380 |
| 5,948,040 A * | 9/1999 | DeLorme et al. | 701/201 |
| 5,970,469 A | 10/1999 | Scroggie et al. | 705/14 |
| 6,012,045 A | 1/2000 | Barzilai et al. | 705/37 |
| 6,014,634 A | 1/2000 | Scroggie et al. | 705/14 |
| 6,021,398 A | 2/2000 | Ausubel | 705/37 |

(Continued)

FOREIGN PATENT DOCUMENTS

JP    402113391    4/1990

(Continued)

OTHER PUBLICATIONS

"Early Birds Online", All Business, printed from http://www.allbusiness.com/periodicals/article/892371-1.html, printed Aug. 8, 2006, 4 pages.

(Continued)

*Primary Examiner* — John G Weiss
*Assistant Examiner* — Victoria Vanderhorst
(74) *Attorney, Agent, or Firm* — Pillsbury Winthrop Shaw Pittman LLP

(57) ABSTRACT

A system and method for reducing excess capacity for restaurants and other industries during off-peak hours is provided. Customers or potential customers may bid on gift certificates redeemable at restaurants during a predetermined time. Users may register with the system and provide identification and demographic information which may be used by restaurants for targeted marketing strategies, promotions, and special offers. The system may include a registration module, an auction module, a restaurant guide module, a restaurant manager module, rewards and referral center module, restaurant reservation module, and advertisement displays.

22 Claims, 18 Drawing Sheets

U.S. PATENT DOCUMENTS

| | | | |
|---|---|---|---|
| 6,038,545 A * | 3/2000 | Mandeberg et al. | 705/15 |
| 6,041,308 A | 3/2000 | Walker et al. | 705/14 |
| 6,061,660 A | 5/2000 | Eggleston et al. | 705/14 |
| 6,085,169 A | 7/2000 | Walker et al. | 705/26 |
| 6,108,639 A | 8/2000 | Walker et al. | 705/26 |
| 6,112,181 A | 8/2000 | Shear et al. | 705/1 |
| 6,134,534 A | 10/2000 | Walker et al. | 705/26 |
| 6,167,327 A | 12/2000 | Broker et al. | 700/238 |
| 6,236,975 B1 | 5/2001 | Boe et al. | 705/7 |
| 6,240,396 B1 | 5/2001 | Walker et al. | 705/26 |
| 6,243,691 B1 | 6/2001 | Fisher et al. | 705/37 |
| 6,266,652 B1 | 7/2001 | Godin et al. | 705/37 |
| 6,327,573 B1 | 12/2001 | Walker et al. | 705/14 |
| 6,332,129 B1 | 12/2001 | Walker et al. | 705/26 |
| 6,345,090 B1 | 2/2002 | Walker et al. | 379/114.12 |
| 6,356,878 B1 | 3/2002 | Walker et al. | 705/26 |
| 6,370,514 B1 | 4/2002 | Messner | 705/14 |
| 6,381,632 B1 | 4/2002 | Lowell | 709/203 |
| 6,418,415 B1 | 7/2002 | Walker et al. | 705/26 |
| 6,434,556 B1 | 8/2002 | Levin et al. | 707/5 |
| 6,449,601 B1 | 9/2002 | Friedland et al. | 705/37 |
| 6,477,503 B1 | 11/2002 | Mankes | 705/5 |
| 6,571,216 B1 * | 5/2003 | Garg et al. | 705/14 |
| 6,687,679 B1 | 2/2004 | Van Luchene et al. | 705/14.13 |
| 6,741,969 B1 | 5/2004 | Chen et al. | 705/14 |
| 6,965,868 B1 | 11/2005 | Bednarek | 705/9 |
| 7,069,228 B1 * | 6/2006 | Rose et al. | 705/5 |
| 7,330,826 B1 | 2/2008 | Porat et al. | 705/26 |
| 2001/0034625 A1 | 10/2001 | Kwoh | 705/6 |
| 2005/0267787 A1 | 12/2005 | Rose et al. | 705/5 |
| 2006/0095434 A1 | 5/2006 | McCullough et al. | 707/10 |
| 2008/0010105 A1 | 1/2008 | Rose et al. | 705/5 |
| 2008/0077454 A1 | 3/2008 | Shepherd et al. | 705/5 |

FOREIGN PATENT DOCUMENTS

| | | |
|---|---|---|
| JP | 2003-168007 | 6/2003 |
| WO | WO 00/60517 | 10/2000 |
| WO | WO 00/72113 | 11/2000 |
| WO | WO 01/22321 | 3/2001 |

OTHER PUBLICATIONS

"Monkey Business on the Net—MonkeyRules.com Works with Restaurants to Develop Customer Database", printed from http://www.findarticles.com/p/articles/mi_m3190/is_50_33/ai_58382099, printed Aug. 8, 2006, 2 pages.

Plotnikoff, "Santa Clara, Calif.-Based Startup Wants to Auction Off Restaurant Meals", Dec. 16, 1999, *KRTBN Knight-Ridder Tribune Business News* (San Jose Mercury News—California).

"AIDS Charity Holds Annual Tastings Fund-Raising Event", Oct. 23, 1995, *Nation's Restaurant News*, vol. 29, No. 42, p. 55.

"Chef Georges Perrier Named Honorary Chairman of First Charity Online Auction", *PR Newswire*, Feb. 4, 1998, 2 pages.

Restaurantrow.com, homepage, proximity search, new restaurants via e-mail, search, search results, Transmedia Card, Jan. 1998.

First Restaurant-to Consumer Internet Auctions; MonkeyRules.com Announces the Launch of its Dining Auction Site, *Business wire*, Dec. 10, 1999.

"Happy Returns: Today's Mail Promotions Blend Sales Incentives and a Bit of Fun", *Shopping Center World*, Sep. 1994, p. 96.

"Hotels Reap Rewards of Saver Deals", *Travel Trade Gazette UK & Ireland*, Oct. 19, 1994, p. 82.

"RestaurantRow.com Launches 'Top Table' and Opens the Doors to New York City's Most Sought After Restaurants", *Business Wire*, Oct. 27, 1999.

Request for Inter Partes Reexamination of U.S. Patent No. 6,741,969, without Exhibits, filed Oct. 6, 2009, 263 pages.

Reexam Control U.S. Appl. No. 95/000,510—Order Granting/Denying Request for Inter Partes Reexamination—Inter Partes Reexamination Communication—Transmittal of Communication to Third Party Requester Inter Partes Reexamination—mailed Dec. 7, 2009, 24 pages.

Reexam Control U.S. Appl. No. 95/000,510—Office Action in Inter Partes Reexamination mailed Dec. 7, 2009, 38 pages.

Exhibit PA-E—Sheryl E. Kimes et al., "Restaurant Revenue Management: Applying Yield Management to the Restaurant Industry", *Cornell Hotel and Restaurant Administration Quarterly*, Jun. 1998, vol. 39, No. 3, at p. 32 ("*Kimes (Jun. 1998)*" or "the Kimes (Jun. 1998) reference")—12 pages.

Exhibit PA-F—Sheryl E. Kimes, "Implementing Restaurant Revenue Management: A Five-Step Approach", *Cornell Hotel and Restaurant Administration Quarterly*, Jun. 1999, vol. 40, No. 3, at p. 16 ("*Kimes (Jun. 1999)*" or "the Kimes (Jun. 1999) reference")—9 pages.

Exhibit PA-G—Sheryl E. Kimes et al., "Developing a Restaurant Revenue-Management Strategy", *Cornell Hotel and Restaurant Administration Quarterly*, Oct. 1999, vol. 40, No. 5, at p. 18 ("*Kimes (Oct. 1999)*" or "the Kimes (Oct. 1999) reference")—16 pages.

Exhibit PA-H—Brian T. Sill, "Capacity Management: Making Your Service Delivery More Productive", *Cornell Hotel and Restaurant Administration Quarterly*, Feb. 1991, vol. 31, No. 1, at p. 77 ("*Sill*" or "the Sill reference")—15 pages.

Exhibit PAT-B—File wrapper of the 6,741,969 patent, 274 pages.

Exhibit PAT-C—File wrapper of U.S. Appl. No. 10/849,935, 423 pages.

Exhibit PAT-D—Westlaw Docket for Pending Litigation: *Mount Hamilton Partners, LLC v. OpenTable, Inc.*, No. 3:09-cv-02074 (N.D. CA) (Complaint filed May 12, 2009), 10 pages.

Exhibit PAT-E—Complaint Filed in Pending Litigation: *Mount Hamilton Partners, LLC v. OpenTable, Inc.*, No. 3:09-cv-02074 (N.D. CA) (Complaint filed May 12, 2009), 45 pages.

Exhibit PAT-F—Plaintiff's Infringement Contentions Filed in Pending Litigation, *Mount Hamilton Partners, LLC v. Open Table, Inc.*, No. 3:09-cv-02074 (N.D. CA), 15 pages.

Exhibit CC-A—Claims 1-12, 22-23, 25-36, and 46-47 Are Anticipated by *DeLorme* Under 35 U.S.C. § 102, 49 pages.

Exhibit CC-B—Claims 1-12, 22-23, 25-36, and 46-47 Are Rendered Obvious Over *DeLorme* Under 35 U.S.C. § 103, 49 pages.

Exhibit CC-C—Claims 1, 9-18, 20-22, 25, 33-42, and 44-46 Are Anticipated by *Bednarek* Under 35 U.S.C. § 102, 35 pages.

Exhibit CC-D—Claims 1, 9-18, 20-22, 25, 33-42, and 44-46 Are Rendered Obvious Over *Bednarek* Under 35 U.S.C. § 103, 35 pages.

Exhibit CC-E—Claims 1-17, 19-41, and 43-48 Are Anticipated by *Porat* Under 35 U.S.C. § 102, 83 pages.

Exhibit CC-F—Claims 1-17, 19-41, and 43-48 Are Anticipated by *Porat* Under 35 U.S.C. § 102, 83 pages.

Exhibit CC-G—Claims 1-18, 20-23, 25-42, and 44-47 Are Rendered Obvious Over *DeLorme* In View Of *Bednarek* Under 35 U.S.C. § 103, 91 pages.

Exhibit CC-H—Claims 1-17, 19-41, and 43-48 Are Rendered Obvious Over *DeLorme* In View Of *Porat* Under 35 U.S.C. § 103, 132 pages.

Exhibit CC-I—Claims 1-48 Are Rendered Obvious Over *Bednarek* In View Of *Porat* Under 35 U.S.C. § 103, 123 pages.

Exhibit CC-J—Claims 1-48 Are Rendered Obvious Over *DeLorme* In View Of *Bednarek* In View Of *Porat* Under 35 U.S.C. § 103, 172 pages.

Exhibit CC-K—Claims 1-23 and 25-47 Are Rendered Obvious Over *DeLorme* In View Of *Bednarek* In View Of *Garg* Under 35 U.S.C. § 103, 114 pages.

Exhibit CC-L—Claims 5 and 29 Are Rendered Obvious Over *DeLorme* In View Of The *Kimes* References In View Of *Sill* Under 35 U.S.C. § 103, 7 pages.

Exhibit CC-M—Claims 5 and 29 Are Rendered Obvious Over *Bednarek* In View Of The *Kimes* References In View Of *Sill* Under 35 U.S.C. § 103, 7 pages.

Exhibit CC-N—Claims 5 and 29 Are Rendered Obvious Over *Porat* In View Of The *Kimes* References In View Of *Sill* Under 35 U.S.C. § 103, 7 pages.

Exhibit CC-O—Claims 13, 22, 37, and 46 Are Rendered Obvious Over *DeLorme* In view Of *Fredregill* Under 35 U.S.C. § 103, 5 pages.

Exhibit CC-P—Claims 13, 16, 22, 37, 40, and 46 Are Rendered Obvious Over *Bednarek* In View Of *Fredregill* Under 35 U.S.C. § 103, 5 pages.

Exhibit CC-Q—Claims 13, 16, 22, 37, 40, and 46 Are Rendered Obvious Over *Porat* In view Of *Fredregill* Under 35 U.S.C. § 103, 5 pages.

Exhibit CC-R—Claims 17-18 and 41-42 Are Rendered Obvious Over *DeLorme* In view Of *Van Luchene* Under 35 U.S.C. § 103, 5 pages.

Exhibit CC-S—Claims 17-18 and 41-42 Are Rendered Obvious Over *Bednarek* In View Of *Van Luchene* Under 35 U.S.C. § 103, 5 pages.

Exhibit CC-T—Claims 13, 17-18, 20, 41-42, and 44 Are Rendered Obvious Over *Porat* In View Of *Van Luchene* Under 35 U.S.C. § 103, 6 pages.

Exhibit CC-U—Claims 1-13, 22-23, 25-37, and 46-47 Are Rendered Obvious Over *Walker* In View Of *Rose* Under 35 U.S.C. § 103, 62 pages.

Exhibit CC-V—Claims 1-17, 19-41, and 43-48 Are Rendered Obvious Over *Walker* In View Of *Rose* In View Of *Porat* Under 35 U.S.C. § 103, 144 pages.

Exhibit CC-W—Claims 5 and 29 Are Rendered Obvious Over *Walker* in View Of *Rose* In View Of The *Kimes* References In View Of *Sill* Under 35 U.S.C. § 103, 7 pages.

Exhibit CC-X—Claims 13, 22, 37, and 46 Are Rendered Obvious Over *Walter* In View Of *Rose* In View Of *Fredregill* Under 35 U.S.C. § 103, 5 pages.

Reexam Control U.S. Appl. No. 95/000,510—Patentee Response to Office Action in *Inter Partes* Reexamination filed Feb. 12, 2010, including attachments, 157 pages.

*Mount Hamilton Partners, LLC* v. *OpenTable, Inc.*, No. C 09-02074 JSW (N.D. CA)—Order Granting Defendant's Motion to Stay All Proceedings Pending Reexamination of Patent-In-Suit, filed Dec. 3, 2009, 2 pages.

*Mount Hamilton Partners, LLC* v. *OpenTable, Inc.*, No. 3:09-cv-02074-JSW (N.D. CA), Docket History, 2 pages.

*Mount Hamilton Partners, LLC* v. *Open Table, Inc.*, No. C 09 02074-JSW (N.D. CA), Defendant and Counterclaimant OpenTable, Inc.'s Invalidity Contentions Pursuant to Patent Local Rules 3-3 and 3-4, filed Oct. 30, 2009, 320 pages.

*Mount Hamilton Partners, LLC* v. *Open Table, Inc.*, No. C 09 02074-JSW (N.D. CA), Defendant and Counterclaimant OpenTable, Inc.'s Objections and Responses to Plaintiff and Counterclaim Defendant Mount Hamilton Partners LLC's First Set of Interrogatories (Nos. 1-7), filed Oct. 14, 2009, 16 pages.

*Mount Hamilton Partners, LLC* v. *Open Table, Inc.*, No. C 09 02074-EDL (N.D. CA), Defendant OpenTable, Inc.'s Answer to Plaintiff's Complaint for Patent Infringement, and Counterclaims—Demand for Jury Trial, filed Jun. 8, 2009, 9 pages.

Muller, Christopher C., "A Simple Measure of Restaurant Efficiency", *Cornell Hotel and Restaurant Administration Quarterly*, Jun. 1999, vol. 40, No. 3, ABI/INFORM Global, pp. 31-37.

Muller, Christopher C., "The On-Line Restaurant", *Fundamentals, A Fundamental Study by Christopher C. Muller, Ph.D.*, Assoc. Prof in the Hospitality Management Department at the University of Central Florida, Orlando/USA, pp. 40, and 42-45.

\* cited by examiner request module 125 restaurant guide 130

| | | |
|---|---|---|
| Max discount set by restaurant | | 35.0% |
| Multiplier set by restaurant for selected date | x | 115.0% |
| Adjusted max. discount | | 40.3% |

FIG. 13

| Customer Profile: | Restaurant Rank (1=Low, 5=High) | Customer Yes=1, No=0 | Points Earned |
|---|---|---|---|
| New Customer (rank not added to "possible" total) | 5 | 0 | 0 |
| Primary Cuisine Type -- in favorite list, | 3 | 1 | 3 |
| Overall Dining Frequency -- 1 to 2x wk | 0 | 1 | 0 |
| Overall Dining Frequency -- 3 to 4x w | 5 | 0 | 0 |
| Overall Dining Frequency -- 4 x+ wk | 5 | 0 | 0 |
| From Internal Tracking: | | | |
| Rest.-Specific Frequency, 2x/mo | 5 | 1 | 5 |
| Rest.-Specific Frequency, 3x/mo | 4 | 0 | 0 |
| Rest.-Specific Frequency, 4x/mo | 2 | 0 | 0 |
| Rest.-Specific Frequency, 5+/mo | 1 | 0 | 0 |
| Single Persons, no kids | 2 | 1 | 2 |
| Married Persons, no kids | 3 | 0 | 0 |
| Married or single persons, with kids | 4 | 0 | 0 |
| Adult, age 18 to 25 (user) | 3 | 0 | 0 |
| Adult, age 26 to 35 (user) | 4 | 1 | 4 |
| Adult, age 36 to 55 (user) | 5 | 0 | 0 |
| Adult, age 56 or older (user) | 4 | 0 | 0 |
| Household Income, $50K or less | 2 | 0 | 0 |
| Household Income, 50K or more | 4 | 1 | 4 |
| Education -- high school | 2 | 0 | 0 |
| Education -- college graduate | 3 | 0 | 0 |
| Education -- graduate degree | 4 | 1 | 4 |
| Party Size -- 1 to 2 | 2 | 1 | 2 |
| Party Size -- 3 to 4 | 4 | 0 | 0 |
| Party Size -- 5 to 8 | 5 | 0 | 0 |
| Party Size -- 8 to 10 | 2 | 0 | 0 |
| Purchases Alcohol -- Always | 5 | 1 | 5 |
| Purchases Alcohol -- Usually | 4 | 0 | 0 |
| Purchases Alcohol -- Occasionally | 2 | 0 | 0 |
| Purchases Alcohol -- Never | 0 | 0 | 0 |
| Highest Possible / Actual Score: (sum of highest score in each category except "new customer") | 40 | | 29 |

FIG. 14

| | | |
|---|---|---|
| Actual Consumer Score div. by | | 29.0 |
| Highest Possible Score | / | 40.0 |
| Percent of Max Discount Earned | | 72.5% |
| | | |
| Adjusted max. discount (from #1) | | 40.3% |
| Percent of Max Discount Earned | x | 72.5% |
| Base Discount Percent | | 29.2% |

FIG. 15

| Competitors defined by Rest. | | Extra Disc%<br>f in User Hist. | Extra Disc%<br>If in Shop. Cart |
|---|---|---|---|
| Competitor #1 | | 4.0% | 6.0% |
| Competitor #2 | | 6.0% | 10.0% |
| Competitor #3 | | 3.0% | 5.0% |
| | | | |
| Base Discount Percent | | 29.2% | |
| Competitor # 3 in User History | + | 3.0% | |
| Competitor #1 in Shopping Cart | + | 6.0% | |
| Offer Discount Percent | | 38% | (rounded for processing) |

FIG. 16

| Party Composition | Number in Party | Avg. Per Person $ | Minimum Spend $ |
|---|---|---|---|
| Adults | 2 | $10.25 | $20.50 |
| Kids | 2 | $4.75 | $9.50 |
| Minimum Spend Amount | | | $30.00 |

FIG. 17

For each Restaurant in the
Shopping Cart:
Restaurant Name

Dining Date and Daypart
Offer: "38% off on a purchase of $30 or more"

FIG. 18

| | | |
|---|---|---|
| User Requested Spend Amount | | $25.00 |
| div. by original Min. Spend Amoun | / | $30.00 |
| equals percent new to original | | 83% (rounded) |
| Less 100% | + | -100% |
| equals percent change | | -17% |
| | | |
| Percent Change times | | -17% |
| "Below" Multiplier set by Rest. | x | 1.50 |
| equals Adjusted percent change | | -25% (rounded for processing) |
| Plus 100% | + | 100% |
| equals Adjustment Factor: | | 75% |
| | | |
| Adjustment of Offer Discount: | | |
| Original Offer Discount Percent | | 38% |
| times Adjustment Factor | x | 75% |
| New Offer Discount Percent: | | 29% |
| | | |
| New Offer: "29% off on a purchase of $25 or more" | | |

FIG. 19

SYSTEM AND METHOD FOR REDUCING EXCESS CAPACITY FOR RESTAURANTS AND OTHER INDUSTRIES DURING OFF-PEAK OR OTHER TIMES

CROSS-REFERENCE TO RELATED APPLICATION

This application is a continuation of U.S. application Ser. No. 09/580,546, filed May 30, 2000, entitled "System and Method for Reducing Excess Capacity for Restaurants and Other Industries During Off-Peak or Other Times", which is a continuation-in-part of U.S. application Ser. No. 09/461,336, filed Dec. 15, 1999, entitled "System and Method for Reducing Excess Capacity for Restaurants and Other Industries during Off-Peak or Other Times."

FIELD OF THE INVENTION

The invention relates to systems and methods for reducing excess capacity for restaurants and other industries during off-peak and other times.

BACKGROUND OF THE INVENTION

Among the many challenges that restaurants face are the challenges of reducing excess capacity during off-peak times and the general lack of customer level information. Restaurants typically have a fixed number of seats. During certain periods there is greater demand for those seats than others. At some times there are people waiting to get seated (for example, on weekend evenings during dinnertime) and at other times there are unused seats (for example, 4-7 p.m. during the week). Typically unused seats translate to lost sales for a restaurant.

Many restaurants do not have detailed information about their customers. This lack of information is a lost opportunity. Typically, restaurants advertise through mass market media (TV, radio, newspapers, etc.). However, this is not the most efficient way to advertise.

These and other drawbacks and challenges face the restaurant industry. Similar problems are faced by other industries that have excess capacity issues.

SUMMARY OF THE INVENTION

An object of the invention is to overcome these and other drawbacks and challenges facing the restaurant and other industries.

Another object of the invention is to provide a website that enables a restaurant to offer (e.g., auction) gift certificates usable during a predetermined period of time (for example, corresponding to a known off-peak period) to enable customers or potential customers to obtain (e.g., bid on) these certificates. According to one embodiment, a minimum price is set for a certificate having a predetermined face value and it is awarded to the highest bidder.

According to another aspect of the invention, a user must register with the website and provide certain identification and demographic information during a registration process before being able to obtain a certificate. This enables restaurants to obtain more information about customers or potential customers who are likely to be influenced by marketing campaigns.

According to other features of the invention, the website may further comprise an interactive restaurant guide, a recipe center, a chat/message board, a gifts center, and an award and referral center. Other features and functions may also be included.

According to one embodiment, the web site enables a user to participate in an auction for one or more gift certificates or merchandise. To facilitate the ability of a user to find an auction of interest, various search tools may be provided. For example, a user may be able to search for auctions for a particular restaurant, for a desired cuisine in a desired city, by zip code or other geographic area, or other search parameters. Additionally, or alternatively, the web site may include a listing of types of cuisine, cities, etc., that a user may select (e.g., by clicking on an icon) to view a listing of auctions relevant to that user. Thus, with these or other tools, a user may browse and select an auction of interest and then participate in one or more desired auctions.

According to one aspect of the invention, auctions may be arranged in various ways. For example, there may be a featured auction area that highlights certain auctions. Various organizational techniques can be used for listing and displaying auctions.

Typically, an auction display will include the name of the restaurant, a description of the certificate being auctioned (for example, promotional material regarding the restaurant or a specific feature of the restaurant), the time period for which the certificate is valid (e.g., Monday only, Monday-Thursday, Monday-Thursday 4-7 p.m., etc.), the value of the certificate (for example, $50.00), any minimum bid, the status of the auction, and other desired information. For example, the status may include the current bid and the time left to bid. Multiple certificates may be auctioned with the same or similar parameters. Also, a user may obtain additional information relating to an auction of interest.

According to another aspect of the invention, a comprehensive interactive restaurant guide is provided. Users may browse by area, cuisine or other parameters when looking for a place to eat. The restaurant guide listings may offer a brief description of restaurants, a community rating (described below), the number and details of current auctions, and other pertinent information.

Preferably, the auction system may be set up with affiliate members, for example, restaurants. According to one embodiment, only affiliate member restaurants are listed in the restaurant guide. According to another embodiment, a broader range of restaurants (or other establishments) may be included.

For example, the guide listing may include the current number of auctions, the name of the restaurant, address, phone number and other information about the restaurant, a description of the restaurant food and other characteristics, and a community rating (such as a star system and/or relative cost index). If a listed restaurant has its own web site, a hyper-link between the restaurant listing and that restaurant's web site may also be provided. If the restaurant is part of a chain or related organizations, the link may be to the chain's home page or one of the related organization's home page.

Alternatively, or in addition thereto, each restaurant in the guide may have a link to a detailed page on the restaurant auction web site described herein. By clicking on the restaurant or the link, a user may read about the restaurant and contribute to restaurant ratings and reviews, based on their own experiences with the restaurant. They can also check for other detailed information such as parking availability, payment types accepted, handicap accessibility, hours of operation, reservation information, menu information, etc. By enabling users to contribute restaurant ratings and reviews, the rating system becomes interactive and adds significant value.

By maintaining a listing of individuals who provide rating and reviews and tracking demographic profile information based on the user, a database may be created to enable the web site to suggest to users other restaurants they may like based on similarity of preferences with other users who have provided reviews.

To participate in an auction, the user may click on an auction icon from a restaurant listing or a restaurant detailed page. The user can bid in a variety of ways. For example, the user can monitor the bids and periodically revise the bid the user is willing to make. Preferably, any user placing a bid first registers and provides payment information, demographics, contact information and other information that may be desirable.

An auto bid feature, also referred to as proxy bidding, may be used to enable the user to submit a maximum bid. The system then bids for the user in small increments (preferably specified by the user) starting with the bid minimum.

According to another embodiment of the invention, if multiple certificates are awarded from one auction, a Dutch auction technique may be used so that the closing price is equal to the lowest winning bid.

As an enticement for users to provide demographic and other information, a personalized page feature may be used for each registered individual. For example, registered users may set up personalized auction lists, check on their rewards, access member support services and other services and features. For example, a "my auctions" portion of the personalized pages may enable the user to monitor his or her current bids or create and browse through custom auction lists.

A "my rewards portion" may be provided to facilitate a loyalty or affinity program for repeat users. This aspect of the invention may enable points or other benefits to be accumulated by users. For example, in addition to providing points for users who participate in auctions, points or other credits may be provided to users who are responsible for having restaurants join the program or other users register with the program. Various awards and rewards based on points may be provided on-line or off-line.

The personalized page may also include a "my profile" section. This section enables the user to enter, review, and update personal information preferences and other information to enable customized information to be obtained about and provided to the user. For example, targeted marketing techniques may be used to inform the user of auctions or other promotions that may be of interest to the user. The targeted marketing and promotions may be based on the user's specified preferences. In addition, an on-line support feature may also be provided.

Another portion of the web site includes a restaurant management feature. This feature enables participating restaurants to create auctions, manage auctions, and monitor the results of auctions. This portion of the web site may include various features such as a product feature, a services feature, a partners' feature, and other features. For example, restaurants that have registered with the web site may view customized web pages that provide access to their auction postings, customer information, certificate sales history and member support. For example, the auction postings feature may enable the restaurant to create new options, delete or modify existing options and track current bids. A "my customers" portion may enable a user to view aggregate, or permit specific data on customers, including demographic information, dining frequency and other user information. As detailed below, these and other features may be incorporated into a data warehouse to enable more sophisticated analysis and targeted marketing.

A promotion feature of the auction manger may be used to facilitate marketing and promotion campaigns. For example, based on user profile information, and user address information (for example, e-mail) targeted marketing campaigns may be effectively implemented.

A sales history portion of the auction manager may enable restaurants to track sales and bids to date. For restaurants and restaurant chains, this information may be provided by days, weeks, months, store region, etc. An account feature of the auction manager enables restaurants to view their account status with the web site. For example, according to one business method, the web site operator may collect a fee for each certificate sold or each certificate posted. Various techniques for collecting the fee may be implemented.

According to one embodiment, the restaurant is billed on-line or off-line for each certificate successfully offered by the restaurant. According to another embodiment, the web site operator may charge successful bidders directly, keep a service fee, and provide the remaining balance to the restaurant. Various other alternatives for billing may also be provided.

According to another business method of the invention, the web site operator may assist the restaurant in targeted marketing campaigns. As discussed above, one way in which this may be done is via email on user's profile information, demographic information, and other information about the user. The web site operator may charge a fee (for example, $0.25 per email) for conducting the targeted campaign for a particular restaurant or a restaurant chain.

The auction listing process may include several features to facilitate and simplify the process. For example, a registered restaurant or restaurant chain may set up an auction that occurs at regularly scheduled intervals until canceled. Alternatively, various restaurant specific information may be stored and used in connection with each auction posted, and only the terms to be varied need to be addressed by the restaurant. For example, when a new auction is created, an item description may be provided by the restaurant. A set of restrictions may then be applied. The restrictions may specify when the certificate is valid. For example, the restaurant can specify the dates, day, month, year for which the period begins and the day, month, year and hour the validity expires. The restaurant may also identify the retail value of the certificate or other benefit(s) to be auctioned. The restaurant may then specify a starting bid amount, for example, at least one third of the retail value or other amount specified by the restaurant. The restaurant may specify the quantity of certificates to be auctioned for that particular auction. The restaurant may further specify the duration of the auction. For example, the auction may be opened for several hours, several days or other time period.

During an auction set up, the restaurant may also specify a recurrence of the auction. For example, the restaurant may select from daily, weekly, every two weeks, monthly or any other period, or may specify that it is a one time auction only.

According to another aspect of the invention, an instant purchase feature may be used. The instant purchase feature may enable a restaurant to specify a fixed dollar amount for which the user may buy the certificate without participating in the auction. For example, if a $50.00 certificate has a $20.00 minimum bid, an auction may proceed on that basis. However, a restaurant may wish to also provide some $50.00 certificate with an instant purchase feature of $35.00 so that any user who wishes to purchase the certificate immediately for $35.00 may do so without waiting for the conclusion of an auction.

According to another business method of the invention, optional features may be provided to generate premium fees for the web site operator. These optional features may enable a restaurant to increase the prominence of the display of its auction versus other auctions hosted by the web site for a fee. For example, a restaurant may display a bold-faced title to its auction for a fee. According to another feature, a particular auction may be highlighted within a particular category (for example, cuisine, city, etc.) According to another feature, certain auctions may be listed on the home page of the web site so that users see these particular auctions immediately without having to search through listings. Each of these features, or combination thereof, along with additional features may be used thereby generating additional revenue.

The process of providing the winning bidders with an auction certificate or other redemption techniques may be accomplished in a variety of ways. For example, according to one embodiment, electronic certificates may be downloaded by or to the winner or emailed to the winner upon completion of the auction. The winner may then print the certificate and present the certificate to the restaurant and redeem it for value. Preferably, if this method is used, the certificate may include the relevant information including the dates of validity, any payment required, the auction winner's name, etc. After dining, the value of the dining certificate is credited to the diner's bill. If the certificate is not pre-paid in a manner described above, the user may pay for the certificate and any balance due at the same time upon completion of the meal.

According to another embodiment, upon successfully winning an auction, an electronic certificate may be sent to the restaurant and/or the winner. If an electronic certificate is sent to the restaurant, the user may simply inform the restaurant that there is a certificate for the user and that amount may be credited automatically to the user's bill so that the user does not need to have a printed certificate. Various other options may be used.

If the certificates are paid for by the winner at the time of the certificate redemption, a mechanism may be established to enable the web site to receive an attendance report or other information to enable it to bill the restaurant for whatever service fee was agreed upon for the auction service.

Certificate sales may be monitored using a sales history option on the web site. This information may be stored by restaurant, by chain, or by other features. The information in the sales history portion may include the number of bidders, any associated time period, the number of certificates sold, the average closing price for each auction or auctions occurring at various times, days, weeks, etc., and the percent of the retail value for which the certificates were sold during a specified period. This information may be presented in various formats including tables, charts, etc.

In addition to increasing sales at restaurants or other establishments by reducing excess capacity, the present invention may provide useful aggregated information to restaurants regarding its customers. For example, a current stats feature may be provided to enable a restaurant to examine aggregate data on all the users who have bid on its auctions or bought one or more certificates. Restaurants may also create surveys to obtain custom information by premium data on competitors' customers.

Customers statistics provide insight to the customer's habits and dining preferences, thereby suggesting ways to more effectively tailor future promotional campaigns. For example, without limitation, the customer statistics may include gender, age, industry/occupation, annual income, zip code, distance from home to restaurant, frequency of dining out, number of bids placed (by restaurant or total), favorite way to learn a promotion (e.g., email, snailmail, telephone, TV ad, radio ad, print ad, on-line ad, or other ways), price sensitivity information (e.g., how much a person cares about getting a good deal when they eat).

The targeted marketing campaign may be facilitated through the web site. For example, a restaurant may buy access to email lists and add space on on-line notices to tailor their marketing to customers likely to be interested in such promotions. The web site may include a promotions management module that enables restaurants to implement these and other features. For example, the promotions management feature may include a section to enable a restaurant to create an email promotion. This may enable a restaurant to create a target campaign and send it to customers by email or other delivery mechanisms. The restaurant may create a web promotion by buying premium space on the web site including selected portions of the auctions and category home pages. Restaurants can also create customized messages that enable the web site users to see these messages as they browse through the site.

Each restaurant's account information including current statement, statement archives, restaurant profiles and contact information may be maintained by the site as well.

According to another aspect of the invention, the web site of the present invention and the promotion features may be linked in to a restaurant reservation system. In this way, more detailed information may be obtained about a restaurant's capacity, the effectiveness of auctions, and historical trends can be discerned. Other benefits may be obtained as well. For example, on successfully winning an auction and being notified, a user may use the web site to request an on-line reservation.

According to another aspect of the invention, the system may offer incentives that may be obtained without participation in an auction. Users may be interested in using the incentive right away and may desire an instant incentive, instead of waiting for an auction to be completed. According to one embodiment, a user may submit one or more incentive requests for selected restaurants along with certain dining parameters. These requests may be processed by or for the restaurants to determine if a dining incentive should be issued to the user. For example, via the web-site, a user may select one or more restaurants from a list of participating restaurants and enter various dining parameters. Each selected restaurant may then determine whether or not to accept the incentive request, based on the user entered dining parameters and other information. If the restaurant decides to accept the request, a dining incentive may be offered to the user. Restaurants may process each incentive request on an individual or batch basis. Also, each restaurant may create customized rules that are stored in the processing system of the present invention where these customized rules are applied to each incentive request or a group of requests. By using restaurant's customized rules, the system may automatically decide whether to accept or reject the incentive requests, determine incentives to offer, and perform other operations.

According to another aspect of the invention, incentives may be issued by the system without a paper certificate. Customers may desire to avoid having a paper certificate or coupon that may get lost. Therefore, the incentive may be issued to the customer electronically. For example, according to one method, the incentive information may be stored with a payment processing system associated with the restaurant. For example, the customer may supply payment information in order to receive an incentive. When that payment information is input at the restaurant, the incentive is automatically retrieved due to the association with the payment information. The incentive may then be automatically deducted from the amount to be charged. If the payment information is a credit card number, the system may employ a fulfillment process that enables a customer to pay the dining bill with a registered credit card (where the credit card number is provided at the time the incentive request is made). According to one embodiment, the credit card charge (which is the full amount of the bill for the meal) is processed so that the incentive amount is credited back to the user, a fee is paid to the web-site operator and the balance is paid to the restaurant. The customer may then receive a confirmation message (e.g., via e-mail) informing the customer that the registered credit card has been credited by a discounted percentage or amount agreed to by the customer. With that message, the user may be queried about the dining experience to get specific feedback. This eliminates the need to present a certificate and provides other advantages.

Other object and advantages of the present invention will be apparent to one of ordinary skill in the art upon reviewing the specification herein.

BRIEF DESCRIPTION OF THE DRAWINGS

FIG. 13 is an example of an adjusted maximum discount calculation according to an embodiment of the present invention.

FIG. 14 is an example of a consumer profile matched to restaurant target factors according to an embodiment of the present invention.

FIG. 15 is an example of a base discount percentage calculation according to an embodiment of the present invention.

FIG. 16 is an example of an adjusted discount percentage for competitors calculation according to an embodiment of the present invention.

FIG. 17 is an example of a minimum spend amount calculation according to an embodiment of the present invention.

FIG. 18 is an example of an offer presentment according to an embodiment of the present invention.

FIG. 19 is an example of an alternate minimum spend amount calculation according to an embodiment of the present invention.

DETAILED DESCRIPTION OF THE PREFERRED EMBODIMENTS

Figure 1:
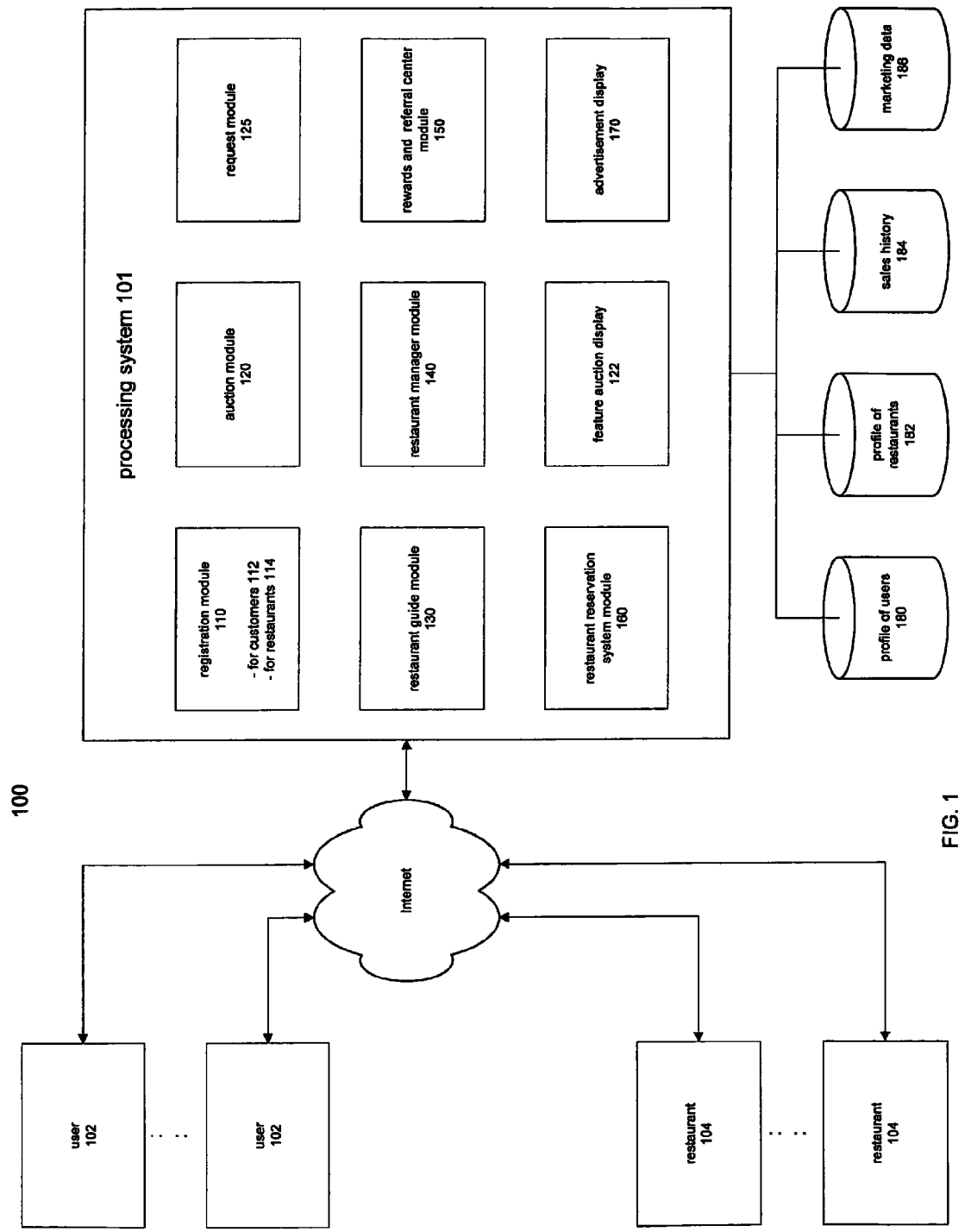
FIG. 1 is a schematic block diagram providing an overview of a system according to an embodiment of the present invention.

One embodiment of the present invention enables a restaurant (or other entity) to offer (e.g., auction) gift certificates valid for a predetermined period of time so that customers or potential customers may bid on these certificates. The predetermined period of time may include off peak hours of restaurant attendance. For example, some restaurants may have excess capacity on Monday-Thursday nights between 4 p.m. and 7 p.m. This results in empty seats and lost revenue. The present invention provides a creative and interactive system and method for auctioning or otherwise offering discount certificates or other promotions at restaurants where the time period of use may be set for off peak hours, days, nights, or even weeks or months.

The present invention may include at least a registration module, an auction module, a request module, a restaurant guide module, a restaurant manager module, a rewards and referral center module, a reservation system module, a feature auction display, an advertisement display, and other service modules and displays.

The registration module enables potential customer participants to sign up to receive restaurant information services and to participate in auctions or other offers for restaurant gift certificates and merchandise at a price below the face value. The potential customer may enter identification information, demographic information, restaurant preferences, and other related information. The information is stored in a database and may be subsequently used by restaurants for targeted marketing predicated on detailed customer information.

The registration module also enables potential restaurant participants to post auctions for gift certificates and merchandise. Restaurants may target off-peak days, nights, and hours. Thus, capacity is increased and revenue is enhanced. Registration with the present invention may also enable restaurants to post advertisements and receive valuable marketing information. The system of the present invention may aggregate all bidding data and provide restaurants with detailed information on their customers and their dining habits, making it easier to target meals, services, and promotions effectively. Restaurants may also participate in chat rooms and message boards to interact with their guests and reach potential or lost customers.

The auction module enables customers to search for a particular restaurant or browse through a category of restaurants and bid on gift certificates or merchandise. The bids may be less than face value in some embodiments to entice users to make a bid on an off-peak restaurant time. The customer may place a bid and periodically update the bid. Alternatively, the customer may use an auto-bid option where a maximum amount is set by the customer and small increments are placed automatically. The customer may also view a personalized auction list that tracks information on a restaurant or restaurants of particular interest to the customer. The personalized auction page may also monitor the customer's rewards, customer's profile and targeted marketing information which may include promotions or special offers to restaurants of interest to the customer.

The request module enables customers to submit an incentive request for one or more selected restaurants. Dining parameters, such as minimum amount the customer is willing to spend, day of the week a customer wants to dine, specific date the customer wants to dine, time, number of individuals in the party, and other information may also be submitted. Based on the dining parameters and other information (e.g., user profile information), a decision may be made as to whether or not an incentive should be given to the customer. User profile information may include information submitted by the user during registration, such as demographic information, dining preferences, and other information. If a request is accepted, the restaurant may provide a dining incentive, such as a discount of a certain amount, valid during a specified time period. Restaurants may process each request on an individual basis. Also, restaurants may create customized rules that reside at a restaurant server or on the processing system of the web-site, where these customized rules are applied to each request to determine whether to award an incentive and how much the incentive should be. Accepted requests may then be displayed to the customer for selection. The customer may select the desired incentive and guarantee the incentive by submitting a credit card number or other payment method (e.g., travelers check, personal check, cashier's check, or store account) or confirming a previously registered credit card number. When the customer pays the check with that credit card number or other payment method, the credit card charge is processed so that the customer receives a credit in the amount of the incentive.

The restaurant guide module enables customers and potential customers to locate restaurants by cuisine, area, price range and other characteristics. A guide listing provides a description of the restaurant along with additional information, such as location, average price, reviews, cuisine, and directions. Customers may view reviews from other diners describing recent dining experiences at a particular restaurant. Also, customers may post reviews of their own dining experiences. Customers may also view and participate in current auctions for gift certificates. Hyper-links to information related to a restaurant may also be provided, such as menus, reviews, and an official restaurant web-site. A recipe center and chat/message board are also available to establish communication between restaurants and customers, including current and potential customers. A gifts center may be available to enable customers to browse and purchase products affiliated with a particular restaurant or products that related to cooking and dining in general. For example, customers may purchase hats, mugs, recipe books, articles of clothing, such as shirts, sweatshirts, jackets, and other types of merchandise imprinted with a particular restaurant. In another example, customers may purchase cooking tools, spices, and cook books that relate to cooking/dining in general and may have no affiliation with a particular restaurant.

A restaurant manager module enables a restaurant to create new auctions, delete existing auctions, modify existing auctions, track current bids, set schedules for the activation of one or more auctions, and create and update auction templates. In addition, restaurants may access customer information to view demographic and dining frequency information. By using this information, restaurants may create targeted advertisements and promotions to customers and potential customers. Sales history is also available to the restaurant. Targeted advertisements may be based on past sales records. Account information regarding fees and payment information are also available.

A rewards and referral module enables a customer to monitor and redeem points and credits awarded to the customer by the present invention. For example, by providing email addresses of friends, business associates, family members, or acquaintances, a customer may receive monetary or other types of rewards.

FIG. 1 is a diagram of an overview of a system 100 that provides auction services and restaurant information services according to an embodiment of the present invention. A plurality of users 102 and restaurants 104 may access system 101 through the Internet or other communication channel. System 101 may contain various service modules and displays including a registration module 110 which may include a module for customers 112 and a module for restaurants 114, an auction module 120, a feature auction display 122, a request module 125, a restaurant guide module 130, a restaurant manager module 140, a rewards and referral center module 150, a restaurant reservation system module 160, and an advertisement display module 170. System 101 may also access databases containing various information regarding customers, restaurants and other pertinent information. For example, databases may include profiles of customers 180, profiles of restaurants 182, sales history records 184, and marketing data 186.

Restaurant reservation system module 160 enables users to make reservations at a desired restaurant by providing information, such as time, number of people, seating preferences, etc. Feature auction display 122 may serve as a premium spot for restaurants to inform users of current or upcoming auctions for dining certificates or other merchandise. Advertisement display 170 features ads from participating restaurants or other merchants.

Figure 2A:
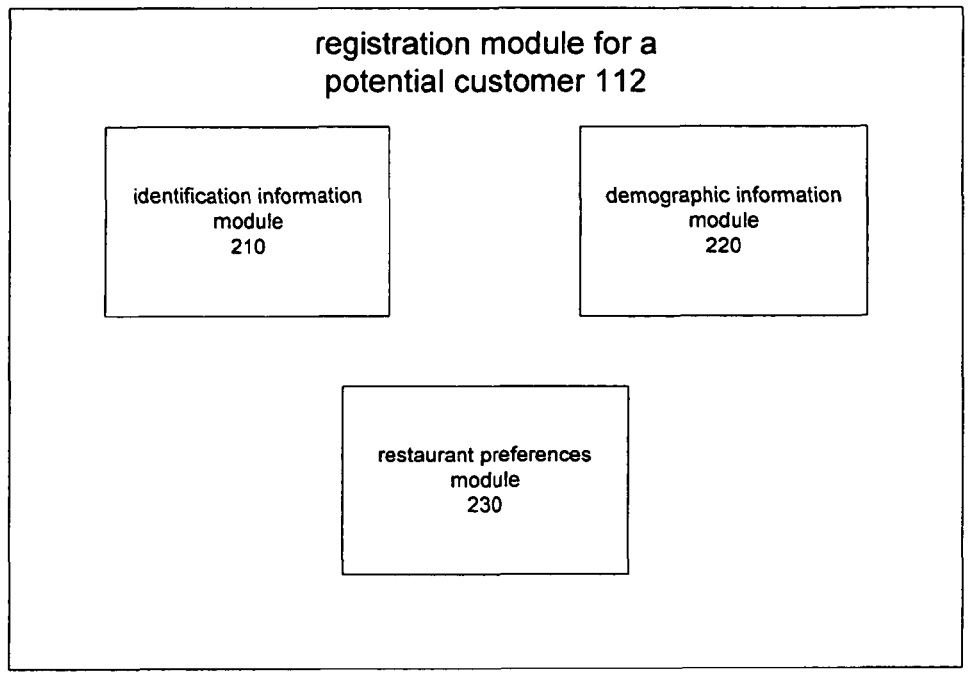
FIG. 2a is an illustration of a registration module for a customer according to an embodiment of the present invention.

To obtain the services and benefits of the present invention, a potential customer may register with system 101, at registration module 112. Previous customers may proceed directly to another module to begin use of the system without re-registering multiple times. FIG. 2a provides an example of a registration page for a potential customer participant. Registration information may include identification information module 210, demographic information module 220, restaurant preference information module 230, and other information modules. For example, identification information may include the potential customer's name, email address, zip code, and a username and password for access to the processing system of the present invention. Demographic information may include profession, income, gender, and age. Restaurant preference information may include dining frequency, favorite restaurants, favorite types of foods, preferred price range, and preferred location of restaurants.

Figure 2B:
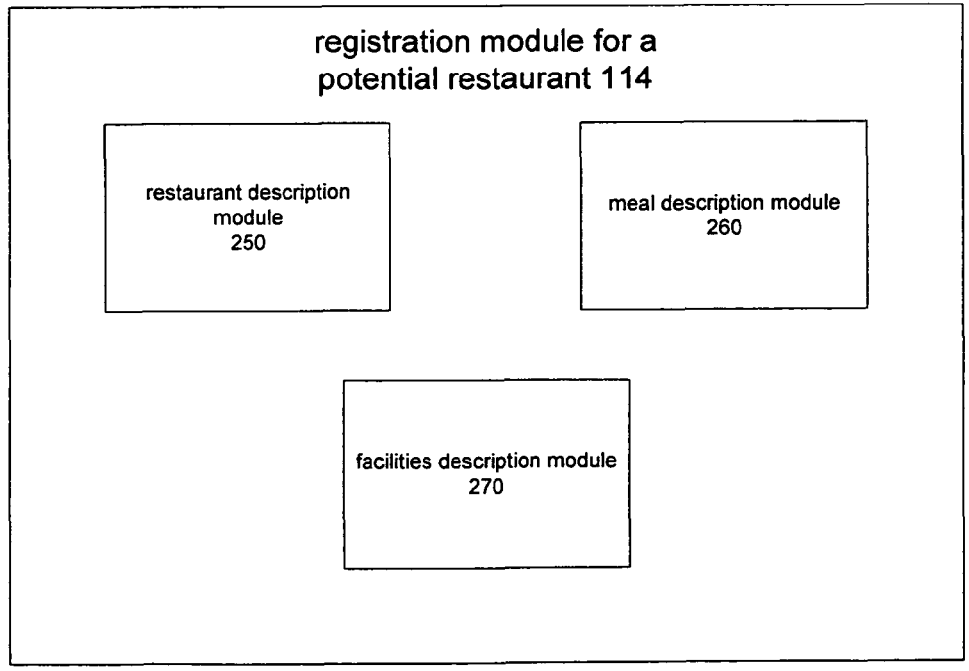
FIG. 2b is an illustration of a registration module for a restaurant according to an embodiment of the present invention.

FIG. 2b provides an example of a registration page for a potential restaurant participant. Registration information may include restaurant description module 250, meal description module 260, facilities description module 270, and other information modules. For example, registration information may include a brief restaurant description, contact person, type of cuisine, average meal price, address, phone number, fax number, email address, hours of operation, credit card access, wheelchair access, parking, valet parking, party space, banquets, outdoor seating, live music, view, child friendly, smoking areas, and other information relating to the restaurant's attributes.

Figure 3A:
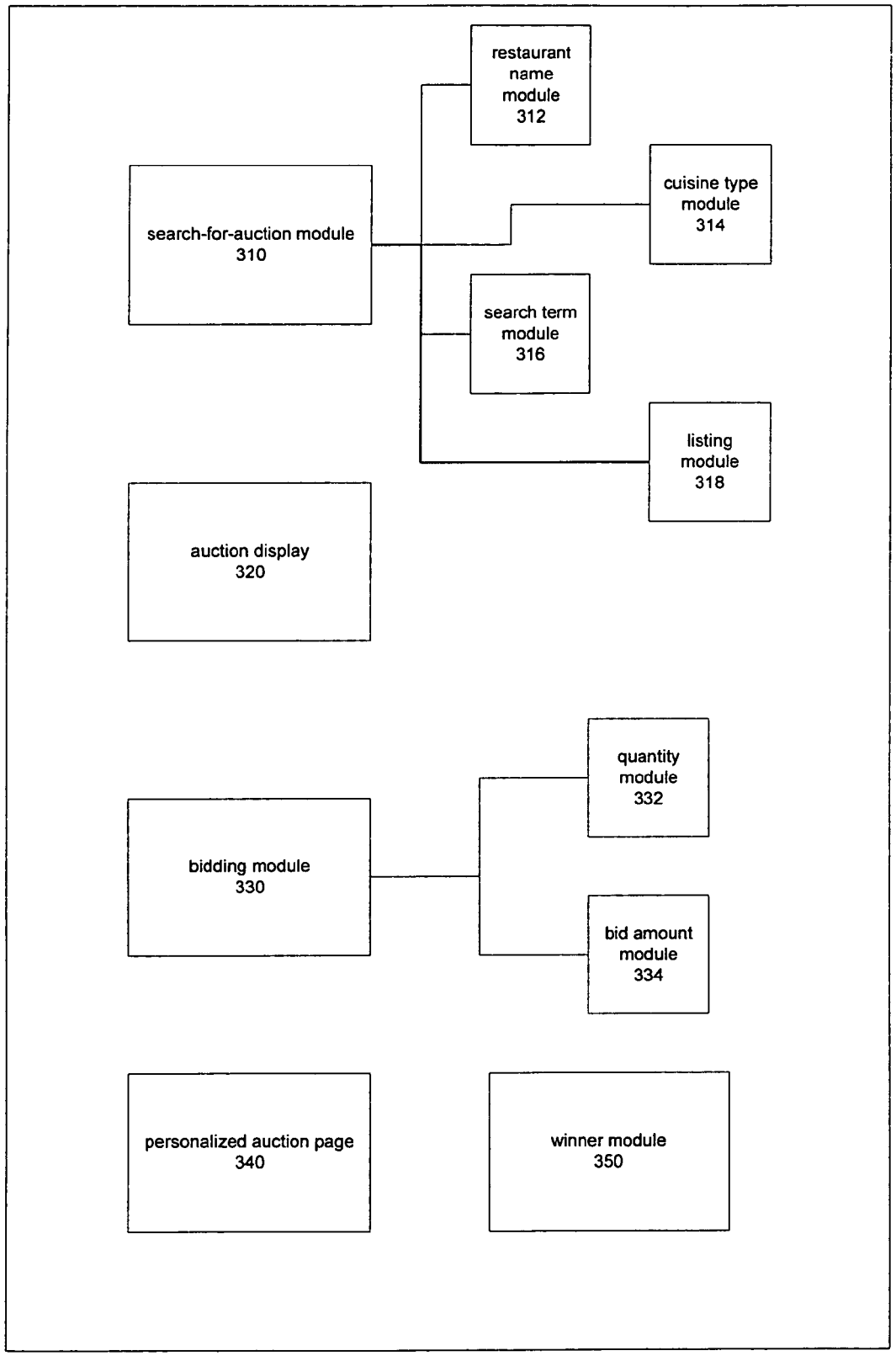
FIG. 3a is an illustration of an auction module according to an embodiment of the present invention.

FIG. 3a is an illustration of an auction module according to an embodiment of the present invention. Auction module 120 may contain a search-for-auction module 310, an auction display module 320, a bidding module 330, and a personalized auction page module 340.

Search-for-auction module 310 may enable the user to locate an auction or auctions by restaurant name through restaurant name module 312, cuisine type through cuisine type module 314, location including city, zip or geographic area, certificate days valid, and other characteristics. The module may also enable the user to enter specific search terms, at search term module 316. Alternatively, a listing of cuisine, cities, etc., may be displayed so that a user may click on a category to view a listing of auctions relevant to that listing, at listing module 318.

An auction display module 320 may then display the auction or auctions. The name of the restaurant with a link to view the restaurant guide and a description of the certificate being auctioned including promotional material, time period, number of certificates, time left to bid, the value of the certificate, minimum bid, status of the auction and current bids may be displayed. Promotional materials may include a slogan, advertisement, a graphic, or a logo relating to a restaurant.

After the bids have been processed, processing system 101 determines the winner of a particular auction. The winner may then be posted through winner module 350. Losing bidders are also notified that the auction that the bidder bid on closed without being declared a winner. In addition, the losing bidder may be notified of other auctions that correspond to one or more parameters of the auction on which the bidder unsuccessfully bid. Also, the winner may download the certificate or item for redemption. Alternatively, the winner may request that the certificate be sent to the restaurant where the winner may inform the restaurant of the certificate at time of redemption.

The user may participate in the bidding through bidding module 330. The user may enter the quantity of bids through quantity module 332, and a bid amount through bid amount module 334. The user may bid in a variety of different ways. For example, the user may monitor the bids and periodically revise the bid to an amount the user is willing to pay. Alternatively, the user may select an auto-bid feature that allows the user to submit a maximum bid amount and a bid increment amount where the bids are automatically incremented up to the maximum amount specified. If multiple certificates are awarded, a Dutch auction technique may be used so that the closing price is equal to the lowest winning bid.

The user may also select personalized auction page 340, as discussed in further detail below.

Figure 3B:
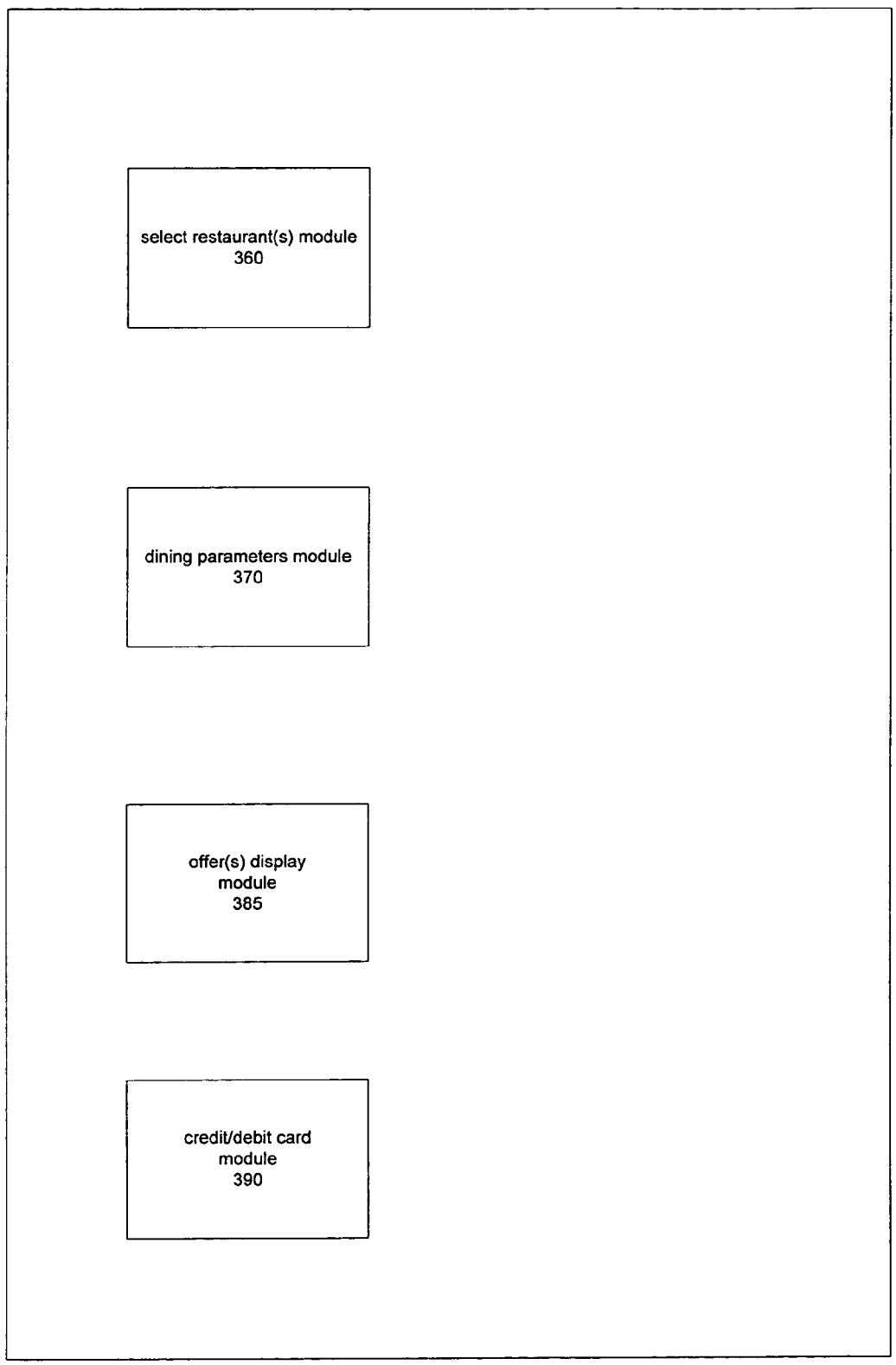
FIG. 3b is an illustration of a request module according to another embodiment of the present invention.

FIG. 3b is an illustration of a request module 125 according to another embodiment of the present invention. This request module may operate on a web server accessible over the Internet by users. This embodiment enables the user to input information sufficient to enable the system to determine what incentives to make available to the user. For example, a user may submit one or more incentive requests for one or more selected restaurants where each selected restaurant may determine whether to accept a user's request and provide a dining incentive. Various modules may be provided that interact with the users to obtain that information. These modules may include a select restaurant module 360 and a dining parameters module 370. Request module 125 may also contain an offer(s) display module 385, a credit/debit card module 390 and other modules.

Select restaurant(s) module 360 may be provided to interact with the user to facilitate the user's selection of one or more restaurants or other dining facilities, either by name, type, category or location. For example, the user may input Bob's House of Beef, Steve's Chinese and Joe's Chili. Also, the user may input and select "all restaurants on K Street in Washington D.C." For example, the user may select three restaurants from which to ask for an incentive, whereby the user will select one depending on the amount of incentive these restaurants will offer. The user may employ various search techniques to specify the one or more restaurants to select. For example, the user may locate one or more restaurants by restaurant name, cuisine type, ratings, expense, reviews, location, and other characteristics. The user may also search by specify various terms. For example, the user may desire to select all restaurants for which a description says "modern" and "unique". Alternatively, the user may view a listing of restaurants and select one or more restaurants from the listing. Essentially, select module 360 may comprise any module that enables a user to select one or more restaurants for which an incentive offer is requested.

The user may enter various dining parameters associated with the request for an incentive, at dining parameters module 370. For example, the user may enter the date the user expects to dine, the time of day during which the user would like to dine, and the number of people that will be in the party. In addition, the user may enter the number of adults and/or number of children that will be in the party. The user may enter the minimum amount the user is willing to spend, at each selected restaurant. The minimum amount the user is willing to spend may vary with each restaurant. For example, the user may enter a higher minimum amount for one restaurant (e.g., a more expensive restaurant) and a lower minimum amount for another (e.g., a less expensive restaurant). Separate input dining parameters may be for each restaurant or restaurant type selected by the user. Other information regarding the user's prospective dining plan may also be entered.

An offer(s) display module 385 may be provided to process the selected restaurants and dining parameters to determine the incentive, if any, each restaurant is willing to provide, the amount, and other terms. The incentive may be a discount in the form of a percentage off, a dollar amount, two-for-one specials, or other incentive.

Each request may be processed on an individual basis by or on behalf of each selected restaurant. For example, for each incentive request, the restaurant may determine whether to accept or reject the request. If the restaurant decides to offer an incentive to the user, the restaurant may determine the amount or type of incentive the restaurant is willing to offer to that particular user based on various factors. For example, if a particular user requests an incentive for a 5:00 pm Thursday night dinner, the restaurant may offer this user a greater incentive because the request is for dinner during off-peak hours. However, if this request is for a night that is booked by a large private party, the restaurant may not feel a need to offer a large incentive. Thus, each incentive request is examined by the restaurant on an individual basis.

Restaurants may create rules to be applied to each request. These rules may be submitted to the processing system of the present invention or may reside on a computer at the restaurant. This enables the restaurants to have determinations made on an automated basis, rather than requiring the restaurant to manually reject, accept, and determine discounts for each individual request.

For example, restaurants may create rules based on user entered variables, internal variables or other information. User entered variables may include registration information submitted by the user (e.g., profile information), dining parameters, and other user entered information. Internal variables may include new customer status, dining frequency, beverage choice, competitive set, and other variables. A competitive set may include a list of the user's preferred restaurants (or restaurants that the user is currently requesting incentives from). Restaurants use competitive sets to evaluate for competitive pressures in processing the incentive requests.

For example, the restaurant may want to target new customers. The restaurant may submit a rule specifying that new customers are to receive a discount of 35% off the minimum amount. Also, if the restaurant wants to discourage or encourage the attendance of children, the restaurant may specify a rule where users who indicate children attendees will receive a small or no incentive to discourage or a relatively larger incentive to encourage.

The restaurants may also specify a scaling function where the more the user is willing to spend, the greater the discount. For example, if a user enters a minimum amount of $30, a 10% discount will be offered. Whereas, if a user enters a minimum amount of $150, a 20% discount will be offered. The scaling may be based on total dollar amount or dollars per person. Restaurants may also define rules to encourage users to dine at a different time. For example, if a user requests an incentive for 7-9 pm, the restaurant may offer a more attractive incentive for 5-7 pm. Multi-unit restaurants may also define rules to encourage users from a busy location to a less busy one. For example, if a user requested an incentive for location A, the restaurant may offer a more attractive incentive if the user is willing go to location B. Other rules and factors may define the restaurants' preferences and goals. Restaurant defined rules enable restaurants to target a specific audience or type of customer.

Once the user has selected an offer displayed in the offer(s) display module 385, the user may secure the savings offered by the selected restaurant with a credit/debit card (or other mode of securing payment) previously submitted or the user may submit a new credit/debit card at this point. The user may dine at the selected restaurant and pay the entire amount of the bill with the registered credit/debit card. After the charge is processed, the incentive amount will be credited back to the user.

Figure 4:
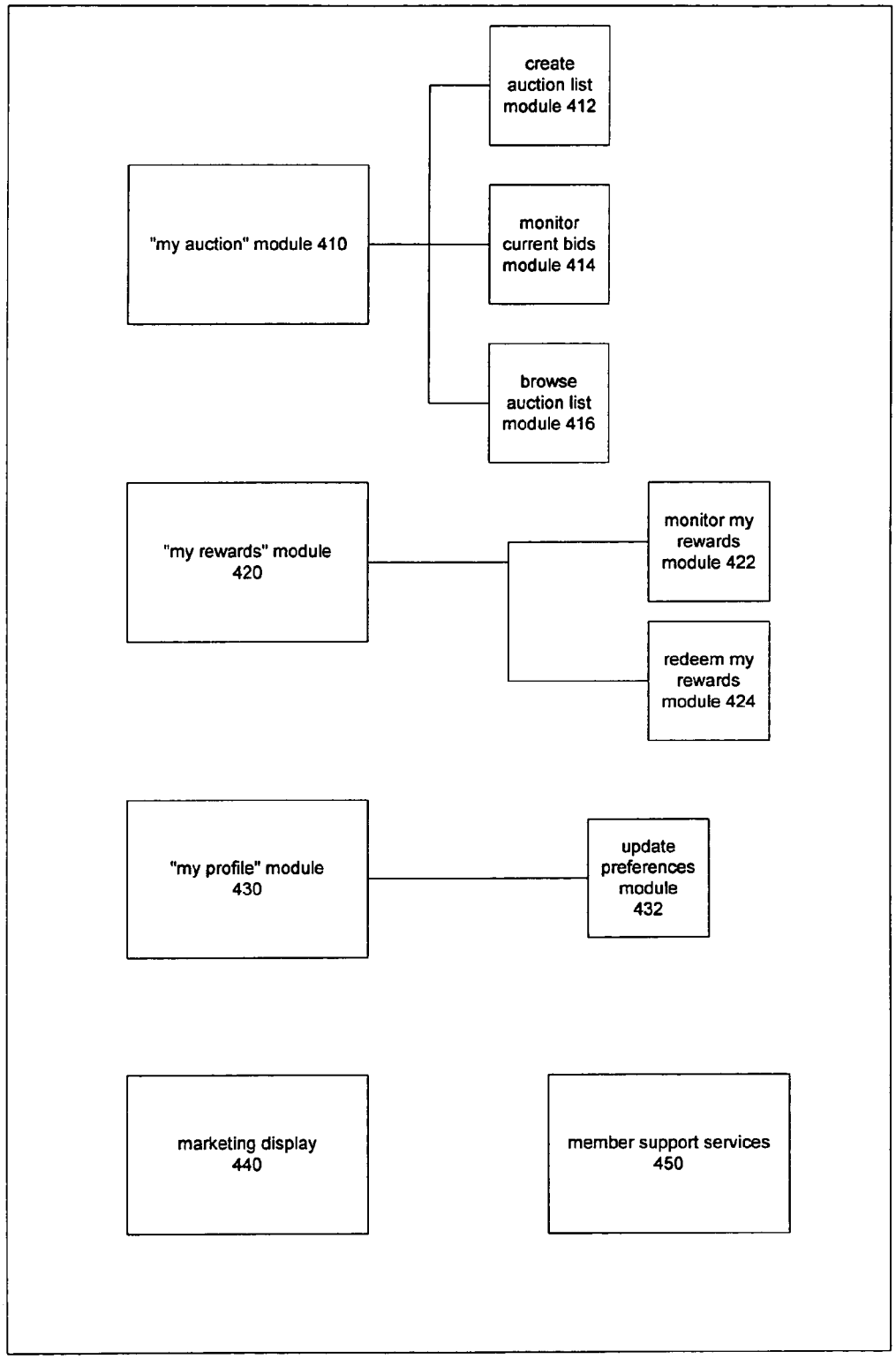
FIG. 4 is an illustration of a graphical user interface for personalized auction information according to an embodiment of the present invention.

A personalized auction page module 340, as shown in FIG. 3a, may be provided. FIG. 4 illustrates an example of a personalized auction page which displays information according to the user's preferences. A personalized auction page may include a "my auctions" module 410, a "my rewards" module 420, a "my profile" module 430, a marketing module 440, and a member support services module 450.

The "my auctions" module 410 may enable the user to create an auction list at create auction list module 412 by specifying a certain restaurant or restaurants of interest, particular characteristics of restaurants, type of cuisine, or other characteristics. The "my auction" module 410 may then display and monitor the current bids for the specified restaurants of interest through a monitor current bids module 414. Users may also browse through an auction list, at browse auction list module 416. The user may monitor and submit bids on gift certificates useable at the user's preferred restaurants.

The "my rewards" module 420 may enable the user to monitor points, credits, and other awards attributed to the user through monitor my rewards module 422. For example, the user may be awarded points or credits for signing up individuals with the present invention. Users may also receive awards and credits for signing up restaurants with the processing system. At any time, a user may redeem or cash in the accumulated points and credits for gift certificates, cash or other types of awards or benefits through redeem my rewards module 424.

The "my profile" module 430 enables the user to modify and update personal preferences and settings, at update preferences module 432. A user may change targeted advertisement settings or restaurant preferences. These settings may affect the type of information received by the user regarding promotions and special offers.

Marketing display 440 presents promotions and special offers from restaurants that are of particular interest to the user based on the user's profile, preference settings, sales history, and other personalized information.

Figure 5:
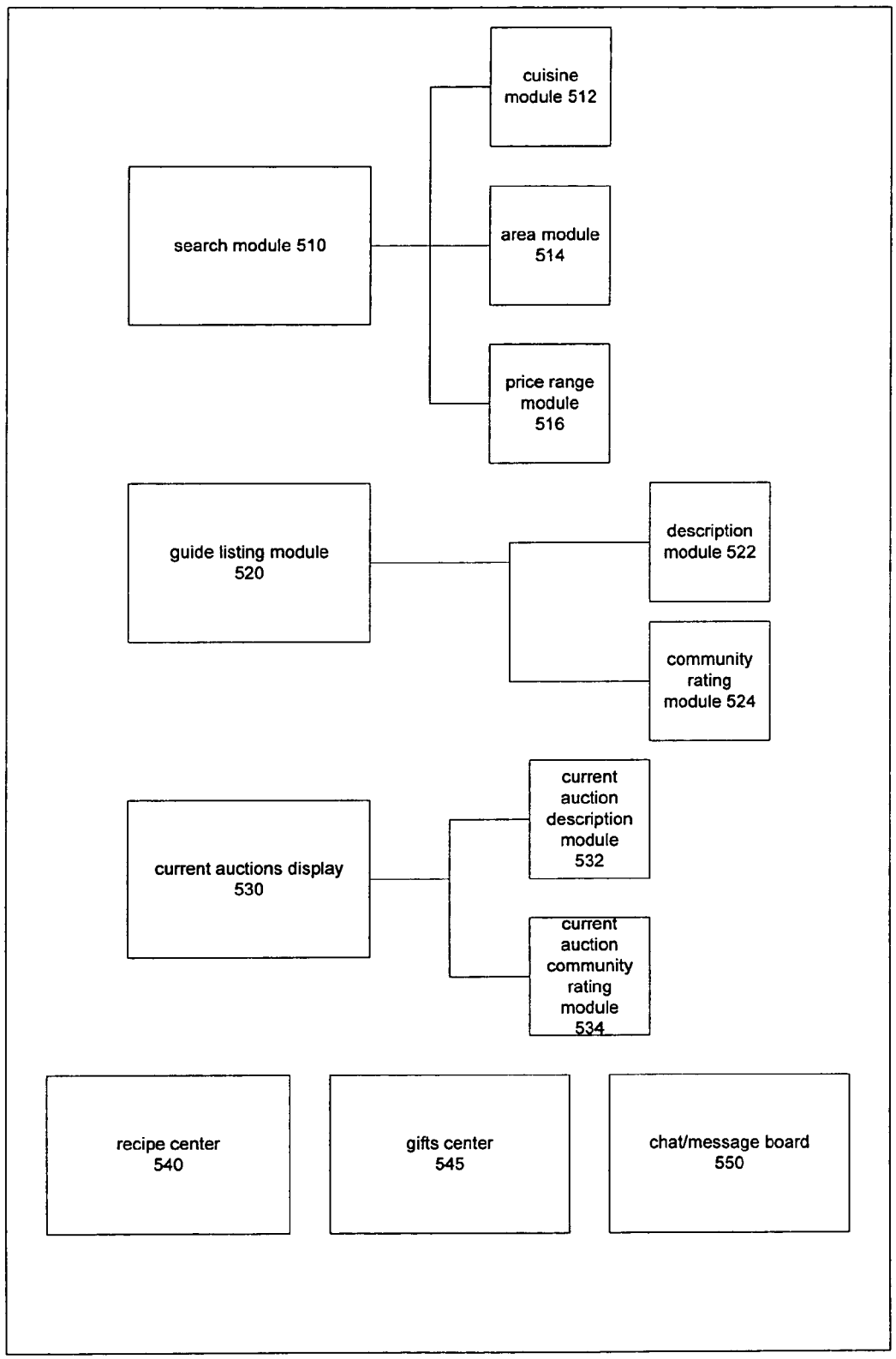
FIG. 5 is an illustration of a restaurant guide module according to an embodiment of the present invention.

FIG. 5 is an illustration of a restaurant guide module 130 according to an embodiment of the present invention. The restaurant guide provides a quick and easy way to obtain information regarding possible places to dine. Reviews and comments by recent customers, driving directions and other pertinent information are provided by this module. Restaurant guide module 130 may include a search module 510, a current auctions display module 520, a guide listings module 530, a recipe center module 540, a gifts center module 545, and a chat/message board module 550.

Search module 510 enables a user to search for a restaurant or restaurants by cuisine type through cuisine module 512, price range through price range module 516, location through area module 514 including zip code, city, or region, or other search parameters. The results of a search may be presented in guide listings module 520.

Guide listings module 520 may provide a description of a restaurant or restaurants including an address, phone number, cuisine type, hours of operation, driving directions, a map, and other characteristics, at description module 522. The user may also view auctions associated with this restaurant and current auctions that are in progress. A community rating and review may also be presented to the user, which may include a cost index, reviews posted by other users of the present invention describing recent dining experiences, at community rating module 524. Information regarding parking, payment options, handicap services, etc. may also be available. Users may post a personal review of the restaurant. A hyperlink to the restaurant's official home-page may also be available along with links to menus and published reviews. In another embodiment, a hyper-link to a separate restaurant page presented by the present invention containing detailed information regarding the restaurant may also be made available.

Current auctions display module 530 displays all the auctions that are currently in progress. If an auction of interest is displayed, a user may participate by placing a bid. A description of the restaurant, at current auction description module 532, along with the specifics of the auction, community ratings and other relevant information may be presented to the user, at current auction community rating module 534.

Recipe center module 540 may provide various recipes and cooking tips from chefs of various restaurants. Alternatively, customers may be able to purchase recipes or a compilation of recipes from a particular restaurant or type of cuisine. This module may also serve as a reference for cooking terminology, exotic and conventional spices, restaurant etiquette, and other topics relating to recipes and dining.

Gifts center module 545 may enable customers to browse and purchase products that may be associated with a particular restaurant or products associated with restaurants in general. For example, a popular Mexican restaurant may provide hats, mugs, T-shirts, sweatshirts and other items imprinted with the restaurant's logo. The gifts center module 545 may offer products related to cooking or dining in general. For example, cooking products, such as salt & pepper grinders, spices, and cooking utensils may be available for purchase.

Chat/Message board module 550 may provide a forum for customers (or potential customers) and restaurant managers, employees or chefs to communicate with each other. Restaurants may obtain valuable feedback from customers regarding service, cuisine/menu selection, ambiance, particular employees of the restaurant (e.g., host, hostess, waiter, waitress) and other information. Also, customers may communicate with other customers of similar tastes in cuisine/restaurants and dining preferences. This service may even serve as a suggestion box for restaurants that value customer feedback.

Figure 6:
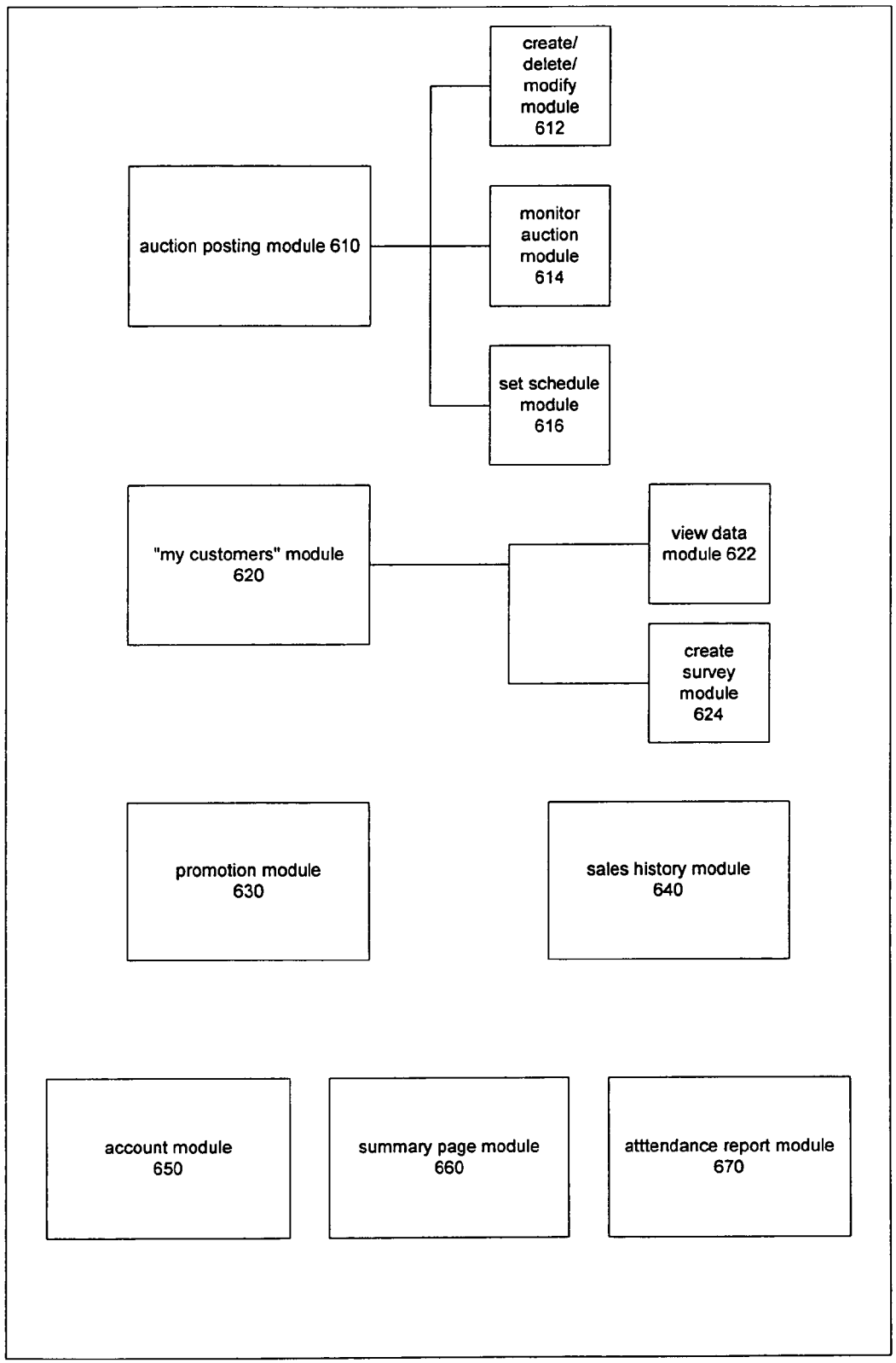
FIG. 6 is an illustration of a restaurant manager module according to an embodiment of the present invention.

FIG. 6 is an illustration of a restaurant manager module 140 according to an embodiment of the present invention. This module provides restaurant participants with a plurality of services, including auction postings and targeted marketing strategies. Oftentimes, restaurants advertise to the public in general. This method of advertisement is ineffective and too broad because specific interests and needs of customers are not addressed. As a result, potential customers are lost and resources are wasted. By providing a method and system of obtaining accurate and recent demographic, identification, and dining information of customers, restaurants may target advertisements to meet the needs of each individual customer thereby attracting more new customers and keeping the current ones. The present invention also provides restaurants with information on the method of communication most preferred by customers. For example, some customers may prefer to receive information via email as opposed to mail delivery. If advertisements and promotions are specifically geared to a customer's personal interests, that customer is more likely to read and take advantage of the special offer. Otherwise, general advertisements are often discarded.

For example, a customer may indicate on his profile that he prefers pasta, chicken, and Italian cuisine, but is allergic to seafood. Targeted advertisements relating to Italian restaurants with special emphasis on pasta dishes with chicken may be sent to this customer. However, advertisements relating to seafood may be avoided.

Restaurant manager module 140 may provide an auction postings module 610, a "my customer" module 620, a promotion module 630, a sales history module 640, and an account module 650.

Auction postings module 610 enables the restaurant to create new auctions, delete existing auctions, and modify existing auctions, at create/delete/modify module 612. Also, current bids may be tracked and monitored, at monitor auction module 614. The restaurant may create, delete and modify auctions through the web-site of the present invention, by fax, or phone service. Also, a schedule may be set by the restaurant wherein a specified number of gift certificates with specified conditions may be made available for auction at a set schedule, at set schedule module 616. For example, ten gift certificates for a particular restaurant may be schedule to be auctioned off every Tuesday for a designated period of time. Restaurants may also store templates of gift certificates at this module for ease in completion and posting.

The "my customers" module 620 enables a restaurant to view aggregate or specific data on customer demographics, dining frequency, and other related information, at view data module 622. A restaurant may also create a survey to be filled out by users of the present invention for more detailed information, at create survey module 624. Restaurants may use customer and dining information to create targeted advertisement to attract a particular customer or group of customers.

Promotion module 630 enables the restaurant to create highly targeted marketing strategies. For example, this module provides the ability to create an email promotion, a web promotion, customized messages online, or other marketing techniques geared to meet the needs of potential customers or current customers. Restaurants may also specify the location of advertisement for greater exposure on areas on the web-site designated as premium space, which may include the home-page, front module pages, etc. Font, size, graphics, color, animation, duration, and other features may be specified for optimal presentation of advertisement. For example, an advertisement may be displayed as the feature auction display 122 on the home-page of the present invention.

Sales history module 640 enables the restaurant to track and monitor sales through the present invention, view bids-to-date, and process other biding information. This information may be organized by days, weeks, months, store region, and other parameters. A sales history report may also include contact information, biographical information, purchasing habit information, and dining preferences. In addition, targeted advertisement may be generated based on past sales information.

Account module 650 provides information regarding fees for each certificate sold or posted. Restaurants may check the status of their bill for various services. For example, the processing system may charge a fee for use of advertisement space on certain premium space. Also, a fee may be generated based on the number of certificates sold through the system. Payment by credit card, checking account, or other modes of payment may be made on this module.

Summary page module 660 may provide the restaurant with a report outlining the results of an auction for one or more items posted by the restaurant. Attendance report module 670 may allow the restaurant to indicate which winners redeemed the items at the restaurant. The information gathered from these modules may be used for targeted marketing and promotions.

Figure 7:
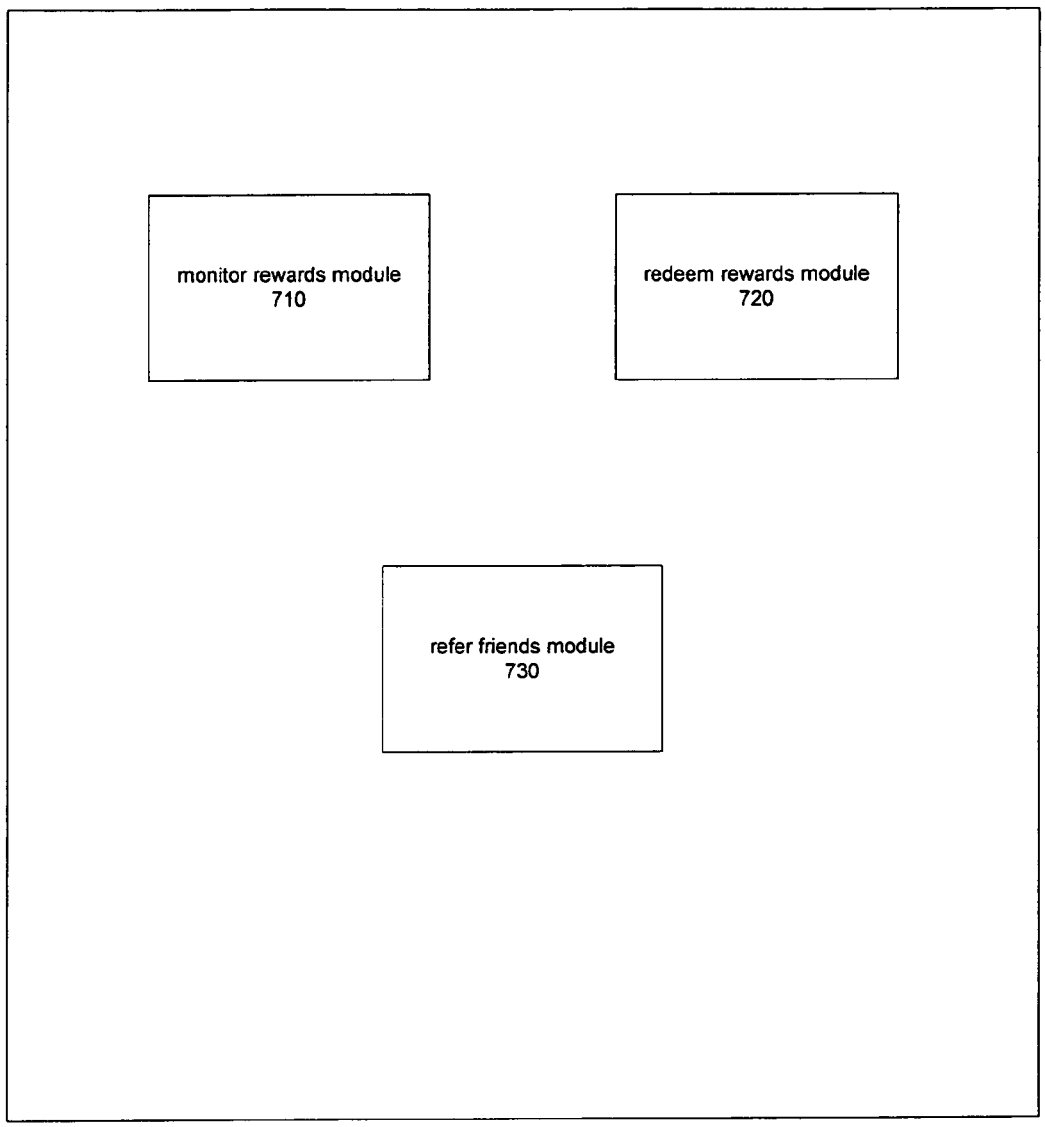
FIG. 7 is an illustration of a rewards and referral module according to an embodiment of the present invention.

FIG. 7 is an illustration of a rewards and referral module 150 according to an embodiment of the present invention. The user may monitor through monitor rewards module 710, and redeem points and/or credits awarded to the user for referrals or other reasons through redeem rewards module 720. The user may provide email addresses or other information of individuals who may be interested in receiving information regarding the present invention through refer friends module 730. For example, for each individual that signs up with the present invention as a result of a referral, the user is awarded points or credits. Also, a user may receive points for each restaurant that signs up with the present invention. When a sufficient amount of points and/or credits have been accumulated, the user may request redemption in cash, gift certificates, or other types of awards.

Figure 8:
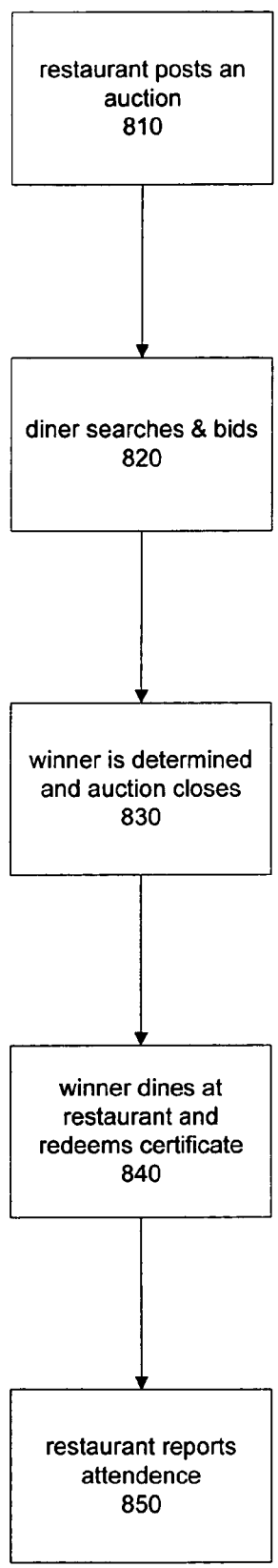
FIG. 8 is a flowchart of an auction process according to an embodiment of the present invention.

FIG. 8 is a diagram of a flowchart of an auction process according to an embodiment of the present invention. A restaurant may post an auction for a dining certificate using the web-site of the present invention, fax, or phone, at step 810. A potential customer may enter the web-site and search for a restaurant of interest by location, cuisine, restaurant name, meal type, certificate days valid, or other parameters. The potential customer may bid on a certificate of choice after credit card registration. When a desired restaurant is found, the potential customer may bid on the dining certificate for a fraction of the face value, at step 820. When a winner is determined, the auction is closed at step 830. Winners and losers may be notified by email, fax, phone or other modes of communication. Also, restaurants may receive a summary page outlining the results of the auction by fax, email, phone or other modes of communication. The winner may dine at the restaurant and receive a discount equal to the dining certificate for the bill, at step 840. The restaurant may then report the customer's attendance in order to ensure correct billing and responsible bidding by customers, at step 850.

When posting an auction at step 810, restaurant may provide a variety of information. This information may include an item description (dining certificate or merchandise), restrictions (valid dates and times), retail value, other benefits, starting bid amount (for example, ⅓ of the retail value), quantity, duration of auction, instant purchase option, recurrence of auction (for example, daily, weekly, etc.), and optional features which may include increasing the prominence of the display through font, bold face, highlight, graphics, and placement on home page and other pages. An instant purchase option may enable a restaurant to specify a fixed dollar amount for which the user may buy a certificate without participating in the auction. For example, a restaurant may wish to provide a specified quantity of $50.00 certificates with an express feature of $35.00 so that any user may purchase the certificate immediately without participating in an auction.

Auction certificates may be provided to winners in a variety of ways. For example, electronic certificates may be downloaded by the winner or emailed to the winner at the close of the auction, after proper payment at the closing price. The winner may present this certificate to the restaurant and have the amount credited to his or her bill after the dining experience. If the certificate is not pre-paid, the user may pay for the certificate and any balance due after dining at the restaurant.

An electronic certificate may be sent to the restaurant and/or the winner. If an electronic certificate is sent to the restaurant, the user may inform the restaurant of the certificate available to the user where the amount is credited automatically to the user's bill. In this case, the user does not need to possess the certificate when dining. After a customer wins a bid, he or she may make a reservation at the restaurant where the certificate is valid, at restaurant reservation module 160.

Certificate sales may be monitored by sales history. The information may include the number of bidders, number of certificates sold including characteristics of the certificates, average closing price, the percent of the retail value for which the certificates were sold and other relevant information.

Figure 9:
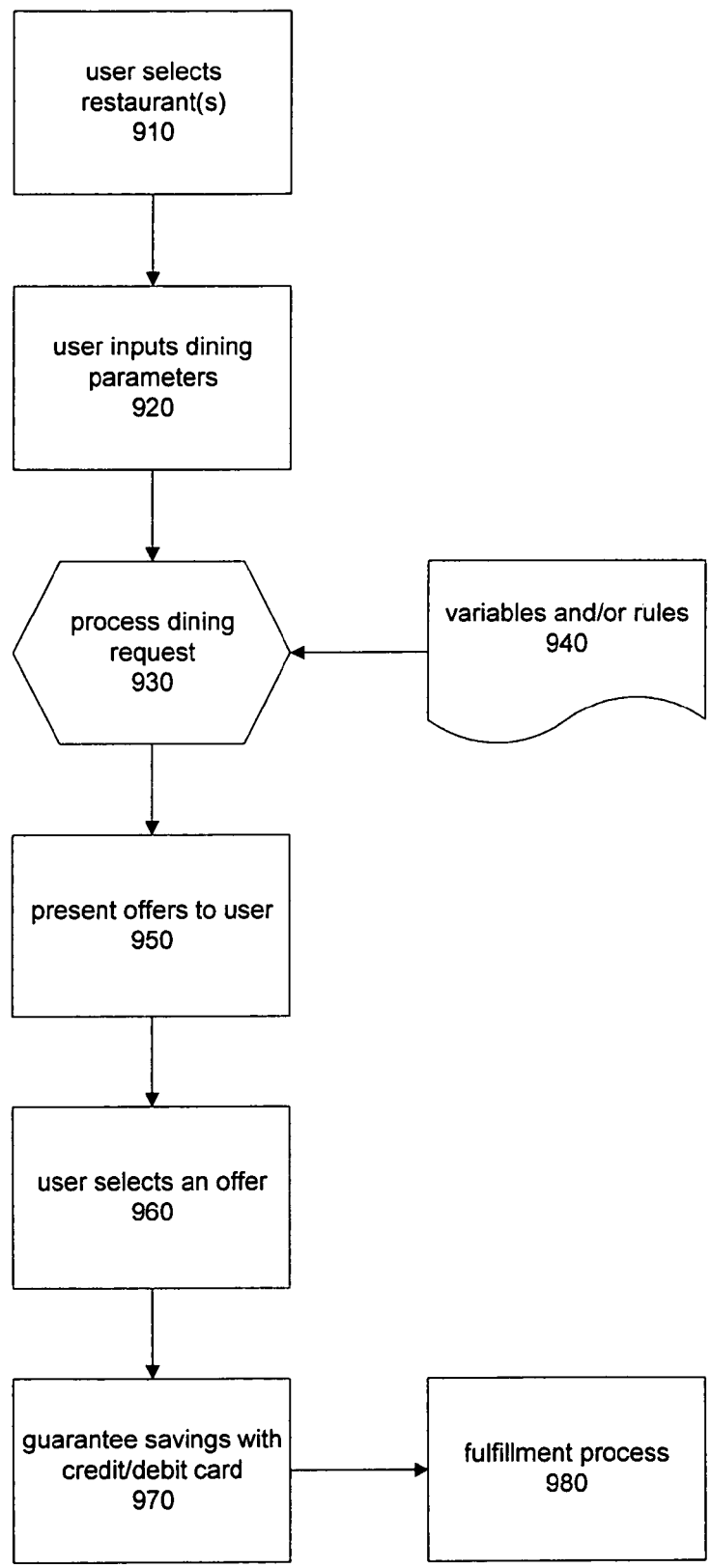
FIG. 9 is a flowchart of an auction process according to another embodiment of the present invention.

FIG. 9 is a diagram of a flowchart of a request process according to an embodiment of the present invention. Users may submit one or more incentive requests at one or more selected restaurants. Incentive requests may further include various dining parameters. Restaurants, in response, may provide dining incentives to the user based on the user's dining parameters, restaurant preferences, sales data, marketing strategies, capacity, and other information. Restaurants may also decide not to provide an incentive to the user and reject the request.

Restaurants may process each incentive request on an individual basis. Also, restaurants may create customized rules that reside at a restaurant server or in the processing system of the present invention where these customized rules are applied to each incentive request.

To participate in a request process according to one embodiment of the present invention, a user may select one or more restaurants, at step 910. The user may input dining parameters, at step 920. Dining parameters may include the date of the dining experience, the time the user wishes to dine, the number of people in the party, how many children and/or adults, and other information. The user may also enter the minimum amount of money the user wishes to spend at each selected restaurant. The minimum amount may vary for each restaurant. For example, if the user selected three restaurants at step 910, the user may submit a bid of $30 at one restaurant and $80 at another more expensive restaurant.

At step 930, each incentive request may then be processed. Factors and/or rules, which may be specified by participating restaurants, may be used to determine whether to accept or reject the incentive request, in step 940. Processing an incentive request may involve determining an acceptance or rejection, calculating an incentive, and performing other operations.

User entered variables, internally tracked variables, and other factors and information may be used to process each incentive request. User entered variables may include information such as the anticipated dining time and date, the number of children, and other information entered by the user. Profile information entered by the user during registration may also be used to process the incentive requests. Internal variables may include information maintained by the restaurant regarding the user's dining habits. Internal variables may include new customer status, dining frequency, beverage choice, past dining feedback, competitive set and other internal variables. Other factors and information may also be used to process incentive requests.

Restaurants may determine whether to accept or reject a user's request on an individual basis. In addition, if a request is accepted, each restaurant may determine an incentive in response to a user's request on an individual basis.

Also, restaurants may submit customized rules to the processing system of the present invention where these customized rules are applied to each incentive request. These customized rules determine whether to accept or reject each incentive request. If a request is accepted, the rules may be used to determine an incentive. An incentive may include a discount amount, discount percentage or other incentive. For example, the restaurant may want to offer higher discounts when a potential customer indicates an off-peak dining time. In this example, the restaurant may offer a 35% discount for any diner who specifies a dining time before 5:00 pm and after 3:00 pm, on a Sunday or a weeknight. Other rules, factors or variables may also be specified by the restaurant. This eliminates the need to individually reject, accept, and calculate the price for each request made by each user. By implementing restaurant defined rules, restaurants may target a specific audience or type of customer.

According to another embodiment of the present invention, automated links to databases of multi-unit restaurants may further enhance the offer generation process through the application of proprietary algorithms. Multi-unit operators routinely poll point-of-sale systems at each restaurant location, and then aggregate key financial and performance data for reporting and forecasting purposes. Restaurants may utilize the latest location-specific sales trend data, hourly sales data, and other forms of information to generate an offer. For example, many restaurants operate in chains where affiliate restaurants are situated in various locations to cater to patrons of different locations. For each affiliate restaurant in a specific location, there may be sales trends specific to that location. Multi-unit operators may utilize these sales data and other information to provide incentives to users who request an incentive for a particular restaurant. For example, a user may request an incentive for Joe's Bistro in the downtown location. However, the downtown location may be busy for the night requested whereas the Joe's Bistro located slightly further away from the city has more tables available. Based on this data and other information, Joe's Bistro may offer the user a greater, more attractive incentive to dine at the less busy location.

At step 950, the one or more offers and applicable incentives may be displayed to the user. The user may then select the desired restaurant and incentive at step 960. At step 970, the user may guarantee the savings with a registered credit/debit card or other mode of securing payment. If a credit/debit card is not registered, the user may register a credit/debit card or other mode of securing payment at this step. The user may then proceed to fulfill the accepted offer, at step 980.

Figure 10:
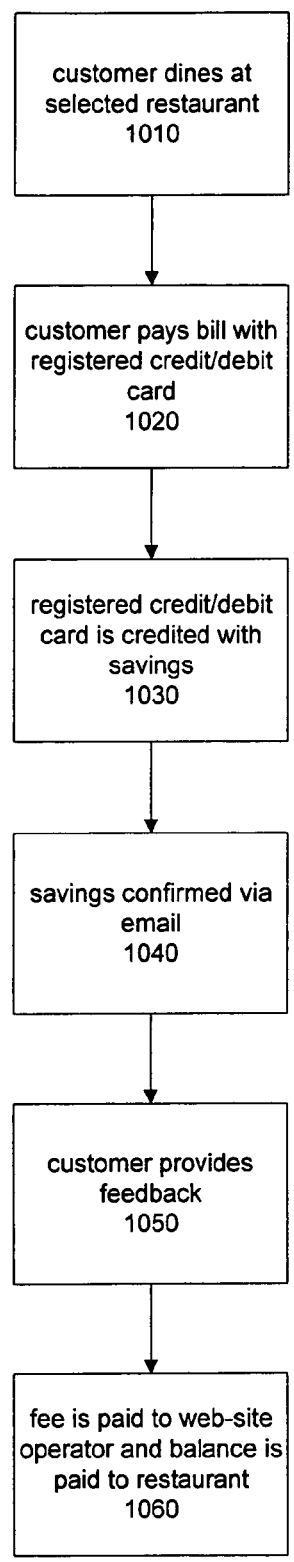
FIG. 10 is a flowchart of a fulfillment process according to an embodiment of the present invention.

FIG. 10 is a diagram of a flowchart illustrating a fulfillment process according to an embodiment of the invention. Once a user has selected an offer and secured the offer with a registered credit/debit card or other mode of securing payment, as discussed in FIG. 9, the user may dine at the selected restaurant at step 1010. At step 1020, the user may then pay the bill with the registered credit/debit card or other mode of securing payment. According to one method, the incentive information may be stored with or accessible by a payment processing system associated with the restaurant. When the user supplies the payment information at the restaurant to pay the bill, the incentive is automatically retrieved due to the association with the payment information. At step 1030, the registered credit/debit card or other mode of securing payment may then be credited with the guaranteed incentive or savings. At step 1040, the customer receives an email or other correspondence confirming the incentive or savings. In addition, information may also be solicited, such as feedback regarding the restaurant and dining experience, at step 1050. The system may present services, advertisements, and other targeted information to the customer. For example, if the customer indicated that he or she had an unpleasant experience at a particular restaurant, that restaurant may offer a coupon/voucher for a discount or other incentive so that the customer may give the restaurant another try. At step 1060, a fee is paid to the web-site operator and the balance is paid to the restaurant.

According to another embodiment of the present invention, restaurants and other entities may track items purchased via the credit/debit redemption process. This capability may be used to enhance user profiles for offer generation. Item specific promotions may also be available to users. These promotions may be funded by the restaurant, or directly by manufacturers or food and beverage suppliers. For example, a user may order a specific bottle of red wine with his or her meal. By fulfilling the incentive with a registered credit/debit card, the restaurant or other entity may keep track of items purchased, such as the particular bottle of red wine. This information may be used to offer an incentive (e.g., 10% discount) for the same bottle of red wine. Also, a competitor may offer a generous discount to the user to try a similar red wine of the competitor's brand.

The present invention may also offer a reward system in the form of reward points with a cash value (e.g., 1 banana point=$1). The system may reward points to users who perform certain activities. Activities may include filling out a survey, writing customer reviews, receiving an opt-in email or performing other activities. These reward points may be used when accepting an offer at a restaurant. For example, when a user accepts an offer to dine at a particular restaurant which will give the user a 30% off discount provided the user spends $40, the user also has the option to redeem the reward points (e.g., banana points) and use them towards the meal. Thus, the user receives a charge for the dinner, a credit back from the incentive, and a credit back from the reward points.

The fulfillment process may be implemented through a third party, such as a credit card company or other processing system.

Figure 11:
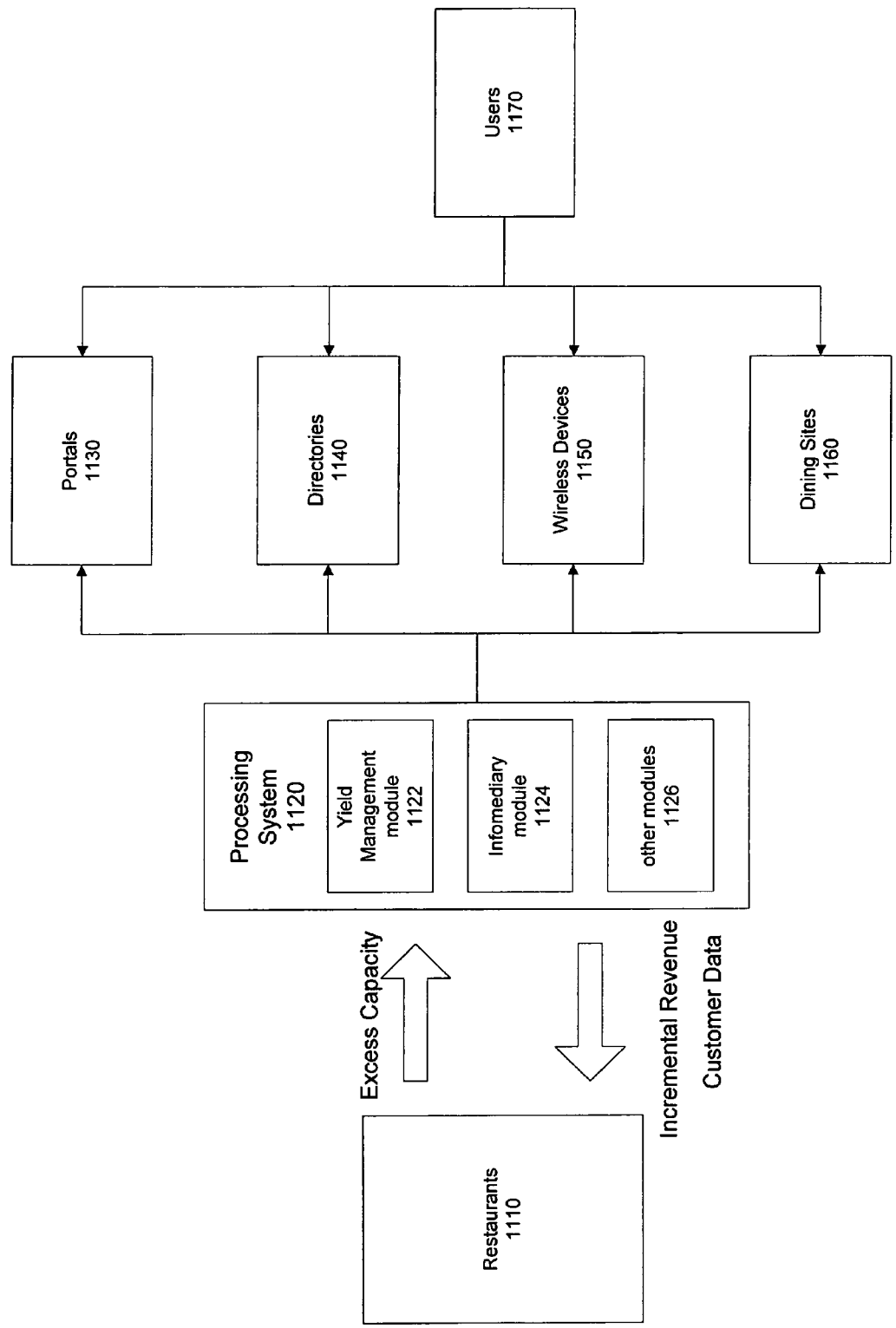
FIG. 11 is a block diagram illustrating a processing system according to an embodiment of the present invention.

FIG. 11 illustrates an overview of another embodiment of the present invention. Restaurants 1110 and other service or product providers may desire to reduce excess capacity during off peak times (e.g., hours, months, seasons, etc.). Processing system 1120 may provide yield management through yield management module 1122, information through infomediary module 1124, and other services and products, through other modules 1126. Processing system 1120 may provide incremental revenue data, customer data, and other services, products, and information to participating restaurants 1110 and other service or product providers. For example, by providing customers with an incentive to dine at restaurants, incremental profits are realized with minimal costs and efforts by the restaurant. Restaurants may reduce excess capacity during off-peak hours by providing incentives to users to dine during those hours. Restaurants may also acquire new guests, gain customer information, preserve price and brand integrity, and other benefits. Users receive benefits as well. For example, users may receive savings on their dining experiences, customer reviews as well as other benefits and services.

Yield management module 1122 may provide reverse auctions, customized pricing, dynamic pricing and other services. Infomediary module 1124 may provide customer profiles, email marketing, loyalty programs, customer feedback and other services.

Users 1170 may access processing system 1120 through portals 1130, such as web-based search engines and other Internet services; directories 1140; wireless devices 1150, such as cellular phones and personal digital assistants (PDAs); and dining sites 1160, such as reservation services, restaurant guides. Other modes of accessing processing system 1120 may also be implemented.

Figure 12:
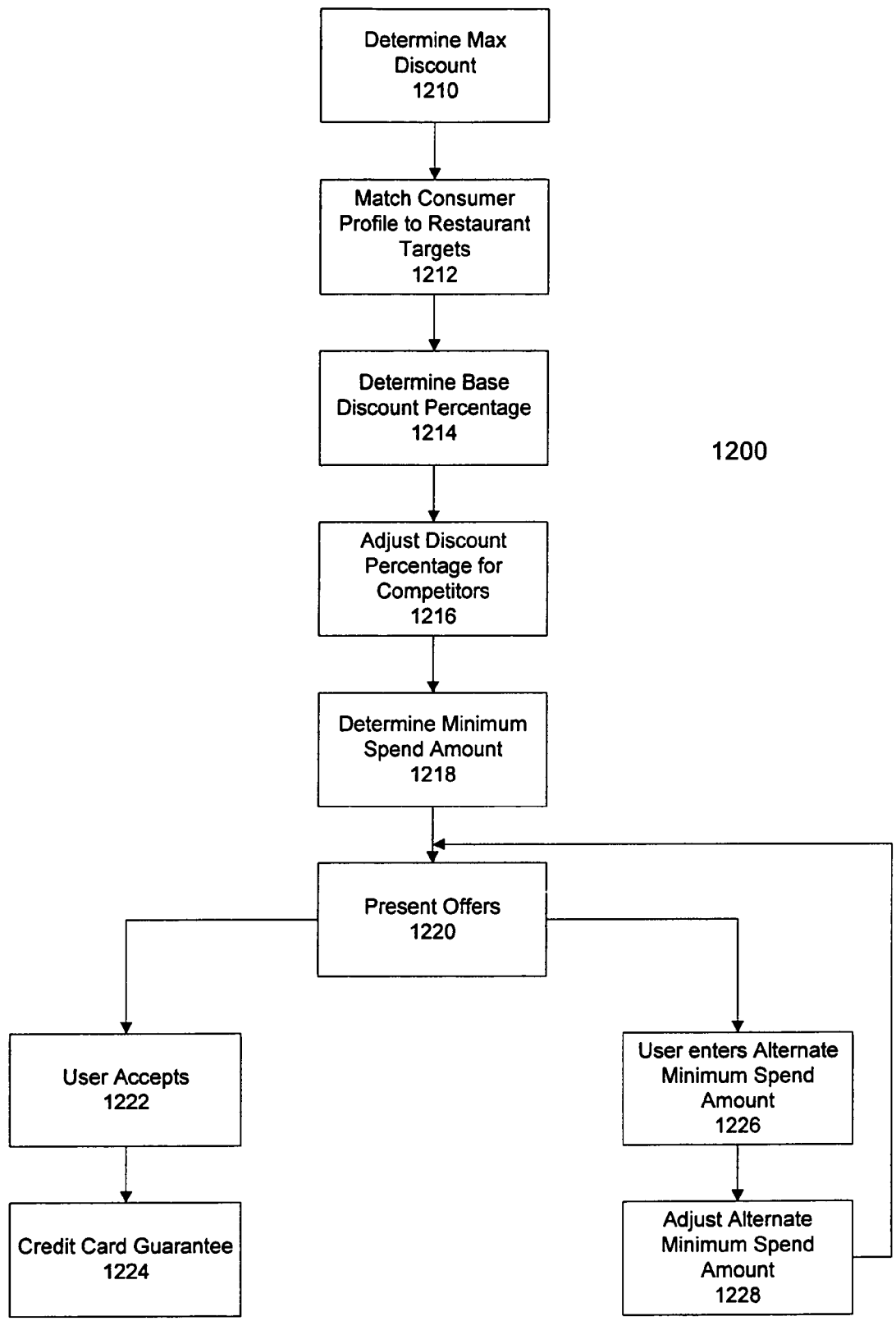
FIG. 12 is a flowchart of an example of an incentive generator according to an embodiment of the present invention.

FIG. 12 is an example of flowchart 1200 illustrating an incentive generator according to an embodiment of the present invention. At step 1210, a restaurant may determine a maximum discount for a selected day or other time frame based on restaurant preferences and other factors. At step 1212, a user's profile or other user entered information may be compared to restaurant target factors. At step 1214, a base discount percentage may be calculated. At step 1216, a restaurant or other entity may define competitors and adjust the base discount percentage based on user history, current user purchases, and other data. At step 1218, a restaurant or other entity may determine a minimum spend amount. At step 1220, for each restaurant, an offer may be presented to the user where the restaurant may specify a discount percentage, a minimum spend amount, and other information. The user may accept an offer from a restaurant or other entity, at step 1222 and proceed to a credit card guarantee process, at step 1224. The user may decide to enter one or more alternative minimum spend amounts, at step 1226. A restaurant may then adjust the percentage in response to the user's alternative minimum spend amount, at step 1228. Each restaurant may then present offers to the user based on the alternate minimum spend amount, at step 1220.

FIG. 13 illustrates an example of a process for determining a maximum discount available according to an embodiment of the present invention. A restaurant or other entity may submit a maximum discount in the form of a percentage or other measurement. In this example, a restaurant has selected a maximum discount of 35.0% off a dining bill, i.e., the maximum discount the restaurant is willing to offer to a user. The restaurant may vary the maximum discount by submitting a multiplier for a selected date, or other time frame. The multiplier may be selected daily, weekly, bi-weekly, monthly, or other length of time. This factor enables the restaurant to alter the maximum amount of discount available to users as needed. In this example, a restaurant has increased the maximum discount by about 15% by indicating a multiplier of 115% for time periods where restaurant capacity is low. A restaurant may also lower the maximum discount by providing a multiplier of less than 100% for time periods when the restaurant is normally busy. An adjusted maximum discount for a selected time frame may be calculated by multiplying the restaurant defined maximum discount and a restaurant defined multiplier. For example, an adjusted maximum discount of 40.3% reflects an increase set by the restaurant defined by a multiplier of 115%.

FIG. 14 illustrates an example of a process for matching a consumer profile to restaurant target factors. A restaurant may assign a rank for various factors to determine an optimal discount amount for a particular user based on user information and preferences. For example, factors may include customer status (e.g., a new customer), cuisine type, dining frequency, internal tracking factors, marital status, age, household income, education, party size, alcoholic beverages, and other factors that may be of interest to the restaurant in determining an optimal incentive amount. A restaurant may rank the importance of various factors by assigning a numerical value to each factor. For example, a restaurant may rank factors by assigning a value of 5 for high importance, 4 for moderately high importance, 3 for some importance, 2 for little importance, and 1 for low importance. In this example, the restaurant may consider new customer status as an important factor by assigning this factor a value of 5 (for high importance). Other methods of assigning importance to factors may also be used.

Customer information and preferences may be used to assign values to each factor. As shown in FIG. 14, customer information may be used to assign a "yes" or "no" answer for each factor. In this example, an answer of "yes" receives one point while an answer of "no" receives zero points. Other point assignments may also be used. For example, customer profile information, which may include demographic information, historical information, and other user input information may be used to assign values to these factors.

The points earned for each factor may be determined by multiplying the restaurant rank and the customer assigned value. For example, a restaurant may want to target users who dine at dining establishments on a frequent basis, e.g., 4 or more times a week, by assigning a high rank to this factor, e.g., 5. Based on the user's profile and historical information, it may be determined that a user dines out about once or twice a week so that a dining frequency factor of 4 or more times a week may receive a "no" answer from the customer, i.e., a zero value. Therefore, the points earned for this factor may be valued at zero (restaurant assigned rank (e.g., 5) multiplied by customer determined value (e.g., 0)).

A highest possible score may be determined by summing the restaurant ranks for all factors. An actual customer score may be determined by summing the points earned for all factors. FIG. 15 illustrates an example of a process for determining a base discount percentage according to an embodiment of the present invention. A percentage of maximum discount earned may be calculated by dividing an actual consumer score by a highest possible score. In this example, an actual customer score of 29 may be divided by a highest possible score of 40 to yield a maximum discount earned percentage of 72.5%. Next, the adjusted maximum discount calculated in FIG. 13 may be applied to the percent of maximum discount earned to obtain a base discount percent. For example, a base discount percent may be calculated by multiplying the adjusted maximum discount of 40.3% and the percent of maximum discount earned of 72.5%. In this example, the base discount percent is determined to be 29.2%. This value is the amount of discount a restaurant has calculated as an optimal amount based on restaurant ranked factors and customer assigned values for each factor.

FIG. 16 illustrates an example of a process for defining competitors and adjusting the base discount percentage based on user history, current user selections and requests, and other data according to another example of the present invention. A restaurant may identify one or more competitors and provide an extra discount incentive if a user has previously or currently purchased or requested incentives associated with one or more competitors. An extra discount incentive may also be provided when a user identifies one or more competitors as a preference, dines at an establishment associated with one or more identified competitors, or performs other transactions associated with competitors. For example, a Mexican restaurant located in Santa Monica may identify three other Tex Mex restaurants within the same area as competitors. The Mexican restaurant may assign a higher extra discount percentage to a fierce competitor and a lower percentage to a different competitor if the user has previously or currently purchased or requested incentives from one or more competitors, for example. A restaurant may offer a different percentage if a user has identified a competitor in a current shopping cart. For example, if a user has purchased an incentive or participated in an auction associated with an identified competitors, the restaurant may be willing to offer a different incentive, e.g., a higher incentive for a current purchase related to an identified competitor. In another example, if a user has purchased an incentive from a competitor for a different day (for example) during the current shopping experience, the restaurant may assign a different discount. In another example, a competitor restaurant may be one of the restaurants that is in current competition for the user's selection. If Competitor #3 is present in the user's history and Competitor #1 is present in a current shopping cart, then the discount percentage may be adjusted by adding 3.0% and 6.0% to the base discount percent of 29.2% to yield an adjusted discount percent of 38%. This enables a restaurant to compete with other restaurants by offering a more attractive incentive to a user. The user also benefits by receiving higher discounts from competing restaurants.

FIG. 17 is an example of a process for determining a minimum spend amount according to another embodiment of the present invention. A restaurant may define a minimum spend amount by evaluating the party composition, time of attendance and other specifics. For example, a user may identify a party of two adults and two children. The restaurant may determine that an adult may spend an average of $10.25 for a meal during the evening and a child may spend an average of $4.75 for a meal during the evening. By calculating the average amount a party of two adults and two children may spend, a minimum spend amount may be determined. The average amount may be determined by historical data, time and day specifics, and other factors. To generate a more attractive incentive, a restaurant may offer a lower minimum spend amount. If customers who dine at a particular restaurant normally drink wine (or other alcoholic beverage) with their meals, a higher minimum spend amount may be offered.

FIG. 18 illustrates an example of a process for presenting offers to a user according to an embodiment of the present invention. For each restaurant selected by the user, the restaurant name, a dining date and incentive may be presented to the user. For example, a restaurant may offer "38% off on a purchase of $30 or more."

A user may then select an offer and proceed to an incentive guarantee process via credit card or other mode of payment. Another option available to the user is the option to enter one or more alternative minimum spend amounts and request a new offer. FIG. 19 illustrates an example of a step for adjusting a minimum spend amount according to an embodiment of the present invention. After receiving the offers, the user may have made changes to his or her dining plan or the user may not be satisfied with the offers he or she received in response to the request for incentives. For example, a user may submit an alternate minimum spend amount of $25.00 where the percentage difference from the original amount of $30.00 is 83%. A percentage of 100% may then be subtracted from 83% to obtain a percent change of −17%, in this example. A restaurant may specify a multiplier for when a user submits an alternate minimum spend amount that is lower/higher than the original spend amount. In this example, a restaurant has specified a "below" multiplier of 1.50 for when the alternate minimum spend amount is lower than the original spend amount. In another example, a restaurant may define a multiplier to adjust offers for requested spend amounts that are greater than the original spend amount.

According to this example, the below multiplier may be multiplied by the percent change to result in an adjusted percent change of −25%. 100% may be added to the adjusted percent change for an adjustment factor of 75%. Next, an adjustment of offer discount may be calculated by adjusting the original offer discount percent by the adjustment factor. In this example, the original offer discount percent of 38% is adjusted by the adjustment factor of 75% for a new offer discount percent of 29%. Therefore, a restaurant may offer an optimal adjusted discount percentage when a user enters an adjusted minimum amount. These offers may then be presented to the user where the user may accept the offer. In another example, the user may submit another alternate minimum spend amount until the user is presented with an offer that is acceptable.

Other embodiments and uses of the invention will be apparent to those skilled in the art from consideration of the specification and practice of the invention disclosed herein. The specification and examples should be considered exemplary only.

What is claimed is:

1. A computer-implemented system for reducing excess capacity for one or more restaurants that experience periods of peak demands and periods of non-peak demands and for collecting information about at least one user, the system comprising:
 a server configured to execute computer program modules corresponding to a website, the computer program modules comprising:
  a registration module configured to obtain information about users via the website, and to register the users to user accounts on the website;
  a request module configured to present an interface to a user via the website through which user requests are received for incentives for dining at restaurants corresponding to one or more user selected restaurant characteristics;
  an incentive module configured to concomitantly present to a user via the website, in response to receipt of a user request for incentives through the interface, a plurality of incentives for dining at any of a set of two or more restaurants that correspond to the one or more user selected restaurant characteristics included in the received user request for incentives,
 wherein the incentives are subject to restrictions,
 wherein the incentive module is configured to provide the incentives with restrictions specifying valid dates and/or times that correspond to non-peak demand periods of the restaurants associated with the incentives to incentivize dining at the restaurants during non-peak demand, and
 wherein the incentive module is configured such that responsive to a first restaurant of the set of restaurants having a different non-peak demand period than a second restaurant of the set of restaurants the incentive module concomitantly presents to the user via the website a first incentive associated with the first restaurant that is subject to different restrictions than a second incentive associated with the second restaurant; and
 a storing module configured to manage storage of the information obtained by the registration module about the users.

2. The system of claim 1, wherein the incentive module is configured to set the restrictions on the incentives based on business rules received at the web site from restaurants in the set of restaurants.

3. The system of claim 1, wherein the computer modules further comprise a redemption module configured to obtain an indication from one of the restaurants in the set of restaurants indicating whether the user has dined in accordance with one of the presented incentives, the redemption module being further configured to credit the incentive to the user account associated with the user in response to obtaining the indication.

4. The system of claim 3, wherein the incentive is downloaded by the at least one registered user from a web-site.

5. The system of claim 3, wherein the incentive is sent to the at least one registered user via electronic mail.

6. The system of claim 1 further comprising a restaurant on-line reservation module that enables the at least one registered user to make a reservation at a corresponding one of the one or more restaurants.

7. The system of claim 1, wherein the set of restaurants includes a restaurant having a plurality of different locations, and the incentives include a plurality of incentives corresponding to different locations of the same restaurant.

8. A computer-implemented system for reducing excess capacity for one or more businesses in an industry that experiences periods of peak demands and periods of non-peak demands and for collecting information about at least one user, the system comprising:
 a server configured to execute computer program modules corresponding to a website, said computer program modules comprising:
  a registration module configured to obtain information about users via the website, and to register the users to user accounts on the website;
  a request module configured to present an interface to a user via the website through which user requests are received for incentives to purchase a service from businesses corresponding to one or more user selected business characteristics;
  an incentive module configured to concomitantly present to a user via the website, responsive to a user request for incentives received through the interface, a plurality of incentives to purchase a service from a set of two or more businesses that correspond to the one or more user selected business characteristics included in the received user request for incentives,
 wherein the incentives are subject to restrictions,
 wherein the incentive module is configured to provide the incentives with restrictions specifying valid dates and/or times that correspond to non-peak demand periods of the businesses associated with the incentives to incentivize purchasing the service at the businesses during non-peak demand, and
 wherein the incentive module is configured such that responsive to a first business of the set of businesses having a different non-peak demand period than a second business of the set of businesses the incentive module concomitantly presents to the user via the website a first incentive associated with the first business that is subject to different restrictions than a second incentive associated with the second business; and a storing module configured to manage storage of the information obtained by the registration module about the users.

9. The system of claim 8, wherein the one or more businesses are food service establishments.

10. The system of claim 8, wherein the set of businesses includes a business having a plurality of different locations, and the incentives include a plurality of incentives corresponding to different locations.

11. A computer-implemented method of reducing excess capacity for one or more businesses in an industry that experience periods of peak demands and periods of non-peak demands and for collecting information about at least one user, wherein the method is implemented in a server configured to execute one or more computer program modules corresponding to a website, the method comprising:

executing, on the server, one or more computer program modules configured to register users based on registration information received from the user;

storing information about the users, including registration information, to a database accessible to the server;

executing, on the server, one or more computer program modules configured to present an interface to a user via the website through which a user request is received for incentives to purchase a service from businesses corresponding to one or more user selected business characteristics;

executing, on the server, one or more computer program modules configured to concomitantly present to the user via the website, in response to the received user request for incentives, incentives to purchase a service at individual ones of a set of two or more businesses that correspond to the one or more user selected business characteristics, wherein the incentives are subject to restrictions, wherein the restrictions of the incentives specify valid dates and/or times that correspond to non-peak demand periods of the businesses associated with the incentives to incentivize purchasing the service at the businesses during non-peak demand, and wherein responsive to a first business of the set of businesses having a different non-peak demand period than a second business of the set of businesses a first incentive associated with the first business is presented at the website concomitantly with a second incentive associated with the second business such that the first incentive is subject to different restrictions than the second incentive.

12. The method of claim 11, wherein the one or more businesses are food service establishments.

13. The method of claim 11, wherein the set of businesses includes a business having a plurality of different locations, and the incentives include a plurality of incentives corresponding to different locations.

14. A computer-implemented method of reducing excess capacity for one or more restaurants that experience periods of peak demands and periods of non-peak demands and for collecting information about at least one user, wherein the method is implemented in a server configured to execute one or more computer program modules corresponding to a website, the method comprising:

executing, on the server, one or more computer program modules configured to register users based on registration information received from the users;

storing information about the users, including registration information, to a database accessible to the server;

executing, on the server, one or more computer program modules configured to present an interface to a user via the website through which a user request is received for incentives for dining at restaurants corresponding to one or more user selected restaurant characteristics;

executing, on the server, one or more computer program modules configured to concomitantly present to a user via the website, in response to the received user request for incentives, incentives for dining at individual ones of a set of two or more restaurants that correspond to the one or more user selected restaurant characteristics, wherein the incentives are subject to restrictions, wherein the restrictions of the incentives specify valid dates and/or times that correspond to non-peak demand periods of the restaurants associated with the incentives to incentivize dining at the restaurants during non-peak demand, and wherein responsive to a first restaurant of the set of restaurants having a different non-peak demand period than a second restaurant of the set of restaurants a first incentive associated with the first restaurant is presented on the website concomitantly with a second incentive associated with the second restaurant such that the first incentive is subject to different restrictions than the second incentive.

15. The method of claim 14, wherein the received user request for incentives includes one or more user specified dining parameters, and wherein the method further comprises:

executing, on the server, one or more computer program modules configured to determine whether the user should receive any incentives to dine at any of the restaurants in the specified set of restaurants, the determination being made based on the one or more user specified dining parameters and business rules associated with individual ones of the restaurants in the specified set of restaurants; and executing, on the server, one or more computer program modules configured to transmit, responsive to a determination that the user should receive one or more incentives to dine at restaurants in the specified set of restaurants, a response to the user via the website presenting the appropriate one or more incentives to dine at the restaurants in the specified set of restaurants.

16. The method of claim 14, wherein the method is conducted by a web-site.

17. The method of claim 14 further comprising: executing, on the server, one or more computer program modules configured to obtain an indication from one of the plurality of restaurants if the user has dined in accordance with one of the presented incentives; and wherein the incentive is credited to the user responsive to the user dining in accordance with one of the presented incentives.

18. The method of claim 17, wherein enabling the at least one registered user to redeem the incentive at the corresponding one of the one or more restaurants to obtain the discount off the purchase further includes:

registering an account corresponding to the at least one registered user in a restaurant payment processing system associated with the corresponding one of the one or more restaurants; and crediting an amount for the incentive to the registered account at a time of payment for the purchase.

19. The method of claim 17, wherein the incentive is downloaded by the at least one registered user from a web-site.

20. The method of claim 17, wherein the incentive is sent to the at least one registered user via electronic mail.

21. The method of claim 14, wherein the set of restaurants includes a restaurant having a plurality of different locations, and the incentives include a plurality of incentives corresponding to different locations of the same restaurant.

22. A computer-implemented system including a website configured to facilitate reduction of excess capacity at two or more restaurants by offering incentives to dine during non-peak demand periods, where individual restaurants are associated with different periods of peak demands and different periods of non-peak demands, to enable users to search for restaurants at which to dine: i) via a restaurant guide module based on one or more user specified restaurant characteristics; or ii) via an incentive request module based on a user initiated request for incentives to dine at two or more restaurants and to display, responsive to the request, the restaurants for which an incentive to dine is available based on the request, and to enable a user to make a reservation at a user selected restaurant, via a restaurant reservation module of the website, based on a restaurant identified via the restaurant guide module or the incentive request module, the system comprising: a server configured to execute computer program modules corresponding to the website, the computer program modules comprising:

the restaurant guide module including:
        i) a restaurant search module configured to search for restaurants based on: a) one or more user specified restaurant characteristics, including restaurant name, location or cuisine type; and/or b) a user selection of a category from a displayed list of categories of restaurant characteristics; and
        ii) a display module configured to present a corresponding list of restaurants having the user specified restaurant characteristics or that are within the user selected category, and to receive input corresponding to a user selected restaurant from the presented list of restaurants;

the incentive request module configured to receive user input corresponding to a user initiated request for incentives to dine at two or more restaurants to identify potential restaurants at which dining is incentivized for the user dine, wherein incentives to dine, for a given restaurant, are subject to restrictions including being valid during a predetermined period corresponding to a non-peak demand period for the given restaurant, wherein the incentive request module includes:
        i) a dining parameters module configured to receive user-specified dining parameters; and
        ii) an incentive display module configured to : a) determine incentives available to the user at the two or more restaurants on a per restaurant basis, based on the user input; b) display the incentives determined to be available to the user on a per restaurant basis; and c) receive user input corresponding to a user selected restaurant for which an incentive is available to the user; and the restaurant reservation module configured to receive user input to make a reservation to dine, via the website, at the restaurant selected by the user via either the restaurant guide module or the incentive request module.

\* \* \* \* \*